(12) United States Patent
Fox et al.

(10) Patent No.: US 9,254,436 B2
(45) Date of Patent: Feb. 9, 2016

(54) REGULAR VISITOR TO FRIEND BOARD IN VIRAL GAME

(71) Applicant: Zynga Inc., San Francisco, CA (US)

(72) Inventors: Jason Fox, San Francisco, CA (US); Michael Starbird, San Francisco, CA (US); Steve Klinkner, San Francisco, CA (US)

(73) Assignee: Zynga Inc., San Francisco, CA (US)

( * ) Notice: Subject to any disclaimer, the term of this patent is extended or adjusted under 35 U.S.C. 154(b) by 32 days.

(21) Appl. No.: 13/945,162

(22) Filed: Jul. 18, 2013

(65) Prior Publication Data

US 2014/0024460 A1 Jan. 23, 2014

Related U.S. Application Data

(60) Provisional application No. 61/674,806, filed on Jul. 23, 2012, provisional application No. 61/674,812, filed on Jul. 23, 2012, provisional application No. 61/674,817, filed on Jul. 23, 2012.

(51) Int. Cl.
*A63F 13/00* (2014.01)
*A63F 13/30* (2014.01)
*A63F 13/80* (2014.01)
*A63F 13/57* (2014.01)

(52) U.S. Cl.
CPC ............... *A63F 13/00* (2013.01); *A63F 13/005* (2013.01); *A63F 13/12* (2013.01); *A63F 13/57* (2014.09); *A63F 13/80* (2014.09); *A63F 2300/535* (2013.01); *A63F 2300/5593* (2013.01)

(58) Field of Classification Search
None
See application file for complete search history.

(56) References Cited

U.S. PATENT DOCUMENTS

| | | | |
|---|---|---|---|
| 2010/0081504 A1* | 4/2010 | Fujisawa | 463/31 |
| 2012/0015733 A1* | 1/2012 | Carroll et al. | 463/40 |
| 2012/0220373 A1* | 8/2012 | Cantor | 463/40 |
| 2013/0035164 A1* | 2/2013 | Osvald et al. | 463/42 |

* cited by examiner

*Primary Examiner* — Jason Yen
(74) *Attorney, Agent, or Firm* — Martine Penilla Group, LLP

(57) ABSTRACT

Methods, systems, and computer programs are presented for presenting Graphical User Interfaces (GUIs) in an online game. In one method, a player becomes a "regular" visitor of a friend when the player visits the friend a predetermined amount of times within a certain period (e.g., three times within the last seven days). When a player becomes a regular visitor, the player may obtain items (e.g., pepper) that are not obtainable in any other way. As long as a player is a regular visitor, the player may continue visiting the friend to continue obtaining the special items. However, if the player falls below the threshold of visits required within the period, the status of regular visitor is lost by the player, and the player may regain the regular status by meeting the requirement again.

16 Claims, 19 Drawing Sheets

Fig. 1D
click to visit
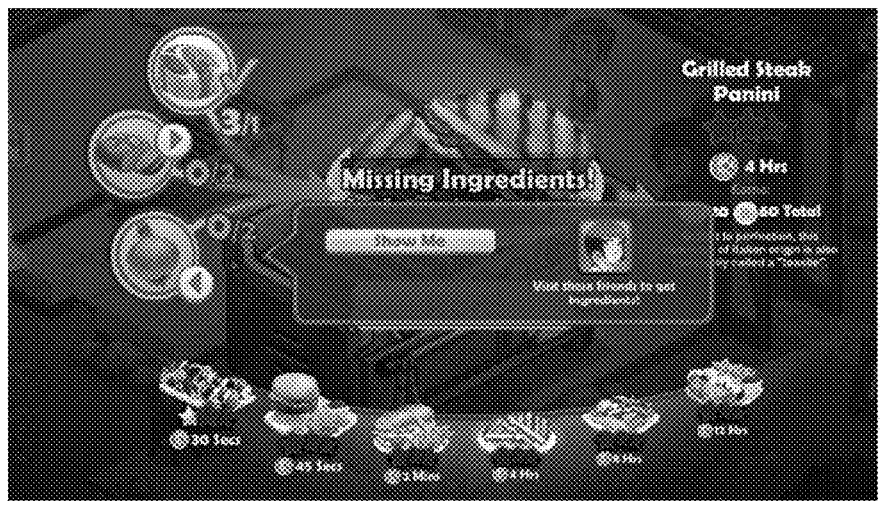
Fig. 2A
Fig. 2B
Fig. 2C

Players visited by Joe

| Al | 5/4/13 | 5/1/13 | 4/7/13 | 1/11/13 | 1/10/12 | 5/9/12 | | | |
|---|---|---|---|---|---|---|---|---|---|
| Pete | | | | | | | | | |
| Dave | 7/1/13 | | | | | | | | |
| Sue | 6/30/13 | 6/29/13 | 6/26/13 | 6/9/13 | 6/8/13 | 6/1/13 | 5/15/13 | 5/14/13 | 5/9/13 |
| Adam | 4/15/13 | 1/2/13 | | | | | | | |
| Dick | 3/7/13 | 3/6/13 | 1/11/12 | 1/10/12 | 5/9/12 | | | | |
| Rick | 6/30/13 | 6/29/13 | 6/8/13 | | | | | | |

Veggie Kebabs

Zynga Executive Chef
Chef DuZynga

INGREDIENTS (serves 20)

2 pounds (905 grams) wild mushrooms
2 medium-sized heirloom tomatoes
2 large zucchini
1 large Vidalia onion
2 large bell peppers
2 medium-sized squash
1 cup (240 milliliters) balsamic vinegar
1 cup (340 grams) honey or agave
1 small bunch Fresh Basil
20 bamboo skewers

DIRECTIONS

1. Soak the skewers for 45 minutes in water. This will prevent them from burning when grilled.
2. Cut vegetables into uniform bite sizes pieces and line them up on the skewers. Arrange vegetables to keep like colors separate. Think rainbows! Keep in mind this can be eaten by hand and doesnt need a knife and fork.
3. To make the veggie glaze, combine the balsamic vinegar and honey (or agave) and simmer for 10 minutes.
4. Let the glaze cool down to room temperature. The glaze will become thicker as it cools down but should still be pourable like honey.
5. While ...

Fig. 9

Ingredient Data

Tomato — 1902
- Cost 1: 20 coins
- Cost 2: 2 bills
- Difficulty level: 5
- Harvest: tomato plant
- Expansion: Fruit stand, supermarket
- Crafted: No
- Quest: Start a Farm
- Available as generic reward during game: Yes
- Recipes: Gazpacho, Veggie Kebab, Chef Salad, ...
- Giftable: Yes
- Available for visiting friend: Yes
- Requestable: Yes
- Regular status only: No
- Mastery level required: 1
...

Pepper — 1904
- Cost 1: Not available
- Cost 2: 20 bills
- Difficulty level: 56
- Harvest: No
- Expansion: No
- Crafted: No
- Quest: "Get 9 tables"
- Available as generic reward during game: No
- Recipes: Chef Salad, spaghetti, ...
- Giftable: No
- Available for visiting friend: No
- Requestable: No
- Regular status only: Yes
- Mastery level required: 5
...

Fig. 21

REGULAR VISITOR TO FRIEND BOARD IN VIRAL GAME

CLAIM OF PRIORITY

This application claims priority from U.S. Provisional Patent Application No. 61/674,806, filed Jul. 23, 2012, and entitled "GRAPHIC USER INTERFACE FOR COOKING GAME;" U.S. Provisional Patent Application No. 61/674,812, filed Jul. 23, 2012, entitled "REGULAR VISITOR TO FRIEND BOARD IN VIRAL GAME;" and from U.S. Provisional Patent Application No. 61/674,817, filed Jul. 23, 2012, entitled "SERVICES FOR IMPORTANT CUSTOMERS IN ONLINE GAME." These provisional applications are herein incorporated by reference.

BACKGROUND

1. Field of the Invention

The present embodiments relate to methods for executing games in a distributed environment, and more particularly, methods, systems, and computer programs for performing viral interactions cooking operations in a cooking game.

2. Description of the Related Art

Online games that allow players to interact with other players have become popular. Some online games, such as chess or bridge, have a small number of players that play together at the same time. Other online games, such as Massively Multiplayer Online (MMO) games, can have a large number of players playing simultaneously. Online game operators, also referred to as social game operators, harness the power of online social networks, to design games that closely integrate the players' social graph data with their existing friendship connections.

Game operators are continuously looking for new ways to improve social interactions to the game and for new game interfaces that provide a realistic experience to players. Players wish to improve their game experience by submerging themselves in the fiction of the game, and the better the experience is, the longer that players will stay in the game and the higher the probability that players invite their friends to play. Improving the way players interact with each other in the game is one way to improve the gaming experience, which differentiates the social game from the one-person game.

It is in this context that embodiments arise.

SUMMARY

Methods, systems, and computer programs are presented for presenting Graphical User Interfaces (GUIs) in an online game. In one method, a player becomes a "regular" visitor of a friend when the player visits the friend a predetermined amount of times within a certain period (e.g., three times within the last seven days). When a player becomes a regular, the player may obtain items (e.g., pepper) that are not obtainable in any other way. As long as a player is a regular visitor, the player may continue visiting the friend to continue obtaining the special items. However, if the player falls below the threshold of visits required within the period, the status of regular visitor is lost by the player, and the player may regain the regular status by meeting the requirement again.

Methods, systems, and computer programs are presented for presenting Graphical User Interfaces (GUIs) in an online game. Some restaurant customers request special non-food related items, such as music or flowers. The customers that request the non-food services are called VIPs (Very Important Persons) in the game fiction. To satisfy the non-food related request, the player must acquire specialty items and deliver these items. If the player satisfies the special request, referred to as a VIP service, the player gets special rewards. In one example, the player gets a recommendation, which may be used to unlock game features, but the reward may also include additional ingredients, currency, expansion areas in the game board, cooking appliances, decorations, etc.

In one embodiment, a method for executing a game includes an operation for detecting a visit by a first player, having a first game board, to a second game board of a second player in the game, where the first game board is different from the second game board. Further, the method includes an operation for determining, within a predetermined time period having a plurality of time slots, a number of time slots where the first player has visited the second game board during a respective time slot. Additionally, the method includes an operation for assigning the first player a regular visitor status when the number of time slots is equal to or greater than a predetermined threshold, and assigning the first player a non-regular visitor status when the number of time slots is less than the predetermined threshold. The game gives the first player a special reward when the first player has the regular visitor status, where the special reward may be obtained in the game by achieving the regular visitor status. In one embodiment, the operations of the method are executed by a processor.

In another embodiment, a non-transitory computer-readable storage medium storing a computer program for executing a game is presented. The computer-readable storage medium includes program instructions for detecting a visit by a first player, having a first game board, to a second game board of a second player in the game, where the first game board is different from the second game board. Further, the computer-readable storage medium includes program instructions for determining, within a predetermined time period having a plurality of time slots, a number of time slots where the first player has visited the second game board during a respective time slot. Additional program instructions are provided for assigning the first player a regular visitor status when the number of time slots is equal to or greater than a predetermined threshold, and assigning the first player a non-regular visitor status when the number of time slots is less than the predetermined threshold. Additional program instructions are provided for giving the first player a special reward when the first player has the regular visitor status, where the special reward may be obtained in the game by achieving the regular visitor status.

In yet another embodiment, a system for executing a game includes a processor and a memory. The memory includes program instructions for a social manager module, a visit manager module, and a game module. The social manager module manages friendship relationships established between players in the game. Further, the visit manager module detects a visit by a first player, having a first game board, to a second game board of a second player in the game, where the first game board is different from the second game board. In addition, the visit manager module determines, within a predetermined time period having a plurality of time slots, a number of time slots where the first player has visited the second game board. Additionally, the visit manager module assigns the first player a regular visitor status when the number of time slots is equal to or greater than a predetermined threshold, and gives the first player a non-regular visitor status when the number of time slots is less than the predetermined threshold. Furthermore, the game module gives the first player a special reward when the first player has the regular visitor status, where the special reward may be obtained in the game by achieving the regular visitor status.

It should be appreciated that the present embodiments can be implemented in numerous ways, such as a method, an apparatus, a system, a device, or a computer program on a computer readable medium. Several embodiments are described below.

BRIEF DESCRIPTION OF THE DRAWINGS

The embodiments may best be understood by reference to the following description taken in conjunction with the accompanying drawings.

FIGS. 1A-1D illustrate a Graphical User Interface (GUI) for performing a cooking operation in the game, according to one embodiment.

FIGS. 2A-2C illustrate an interface for determining the missing ingredients in a dish, according to one embodiment.

FIG. 9 is an e-mail sent from the game to a player, where the email includes a recipe obtained in the game, according to one embodiment.

FIG. 21 is a data structure for storing ingredient data, according to one embodiment.

DETAILED DESCRIPTION

It will be apparent, that the present embodiments may be practiced without some or all of these specific details. In other instances, well known process operations have not been described in detail in order not to unnecessarily obscure the present embodiments.

FIGS. 1A-1D illustrate a Graphical User Interface (GUI) for performing a cooking operation in the game, according to one embodiment. FIGS. 1A-1D show the GUI for the cooking game, which includes a cooking appliance (e.g., a grill), a cooking chef, an avatar that performs operations for the player, and other non-player characters (NPCs), such as a waiter that serves dishes to customers. In addition, there are tables with chairs for the customers. The cooking game also includes other areas, such as a farm where ingredients may be grown, additional cooking stations, expansion areas where ingredients may be obtained (e.g., a bakery), etc.

In one embodiment, progress in the cooking game is made by cooking dishes and serving the dishes to customers. After customers finish eating the dishes, the player gets rewards, such as in-game currency, mastery stars, experience points, etc. The player is also able to expand the game by adding space to the restaurant, buying more cooking appliances, tables, decorations, etc.

Figure 1A:
Figure 1B:
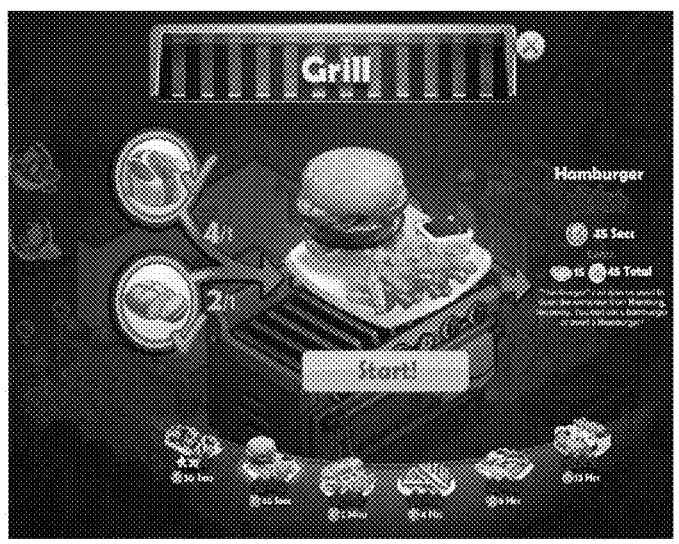

FIG. 1A is part of an introductory tutorial to the game where the player is asked to click on the cooking appliance, a grill. After the player clicks on the grill, a new user interface for the grill is presented. Over imposed around the grill are several dishes that can be cooked in this cooking appliance, such as a vegetable kebab, a hamburger, a roast beef sandwich, a grilled sandwich, grilled salmon, etc. In one embodiment, some of the dishes may be given a grey shading to indicate that the player does not have access to these dishes. In addition, each dish has a number of stars, which relate to a mastery level required to cook the dish. The mastery level is a measurement of progress in the game, and as the player achieves higher mastery levels, the player is able to access additional game features, dishes, cooking appliances, decorations, etc.

Once the player selects a dish, the interface presents the ingredients needed to make the dish and, next to each ingredient, two numbers are presented indicating how many of these ingredients the player currently owns, and how many ingredients are needed for cooking this dish. For example, a ratio of 4/1 next to the meat indicates that the player has four pieces of meat to cook with and that only one is needed to make the hamburger. If the player does not have the minimum number of ingredients to make the dish, then the player cannot cook the dish and the player has to perform additional game operations to get the missing ingredients. For example, if the player needs two potatoes but the player only has one potato to make a dish, the ratio would be 1/2, which shows that the player is short one potato. More details are given below on how to get missing ingredients with reference to FIGS. 2A-2C, 4A-4C.

In one embodiment, the dish also has a preparation time (e.g., 45 seconds, 12 hours, etc.), which is the amount of time needed to cook the dish once cooking starts. In addition, next to the dish some rewards may be shown indicating the prizes to be obtained by the user when the dish is completed, such as how many servings of the dish are available to serve to clients of the restaurant, a mastery start, and some game coins.

Figure 1C:

If the player owns the ingredients needed to make the dish, a start button is presented to the user to enable the user to start the cooking process. In one embodiment, if the player selects the start button, the player is presented a new user interface to add the ingredients to the cooking appliance, as shown in FIG. 1C.

The ingredients are presented around the cooking appliance, and the ingredients are selectable by the player (e.g., via mouse click or by passing the mouse cursor over the ingredient, referred to herein as a mouse over). In one embodiment, an additional element is presented together with the ingredients. This additional element is also referred to as the finishing touch, the last operation, the flourish, the cooking start, the cooking finishing moves, etc., and is used as the last operation in preparing the dish, after all the other ingredients have already been added to the cooking appliance. In one embodiment, the finishing touch is not selectable until all the ingredients have been added to the cooking appliance. Embodiments described below refer to the finishing touch as being part of the cooking process, but other embodiments may also be implemented without the use of the finishing touch.

Figure 3A:
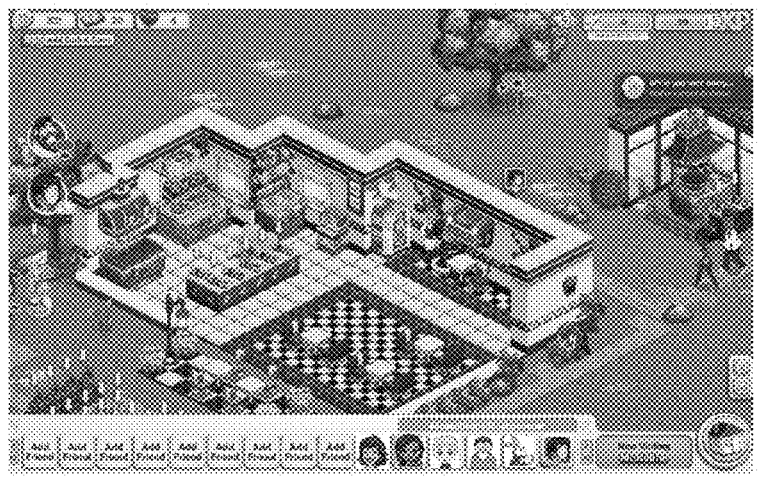
FIGS. 3A-3D illustrate the operation for visiting a friend in the game, according to one embodiment.
Figure 3B:

FIG. 1D illustrates an example of a user interface to notify the user that the cooking of the dish is complete. In one embodiment, once the user selects the disk on the appliance, the dish is moved to a serving tray or serving area, where a waiter is able to take the dishes from the serving area to the customers of the restaurant. See also FIG. 3A showing food on a serving table that is ready for restaurant customers.

In one embodiment, a game bar in the GUI includes a list of friends, represented by respective icons, photos, or drawings of the friends, and a menu of game options, such as go to the market, see the game inventory, social area, gifts, etc. The game bar is expandable and has a variable number of friends, where the number of friends presented depends on one or more factors, such as how many friends the player has in the game, the current screen size where the GUI is being displayed, the game elements being displayed at a certain time (e.g., the presence of a chat window for chatting with other players may decrease the size of the game bar), etc.

In some embodiments, slots for adding friends (e.g. "Add Friend") are presented in the expandable game bar, and if the player clicks on the "Add Friend" slot then a user interface is presented to add a new friend for the player in the game. The interface may include sending an invitation to the friend via intra-game communications or via an external website, such as a social network. In one embodiment, the number of slots for adding friends is limited to one slot, while in other embodiments the GUI bar may include more than one slot for adding friends.

In one embodiment, when the player clicks in one of the friends in the game bar, the game initiates a visit to the selected friend. A visit to the game board of the friend includes transporting the avatar of the player to the game board of the friend, and enabling the player to perform game operations within the game board of the friend being visited.

FIGS. 2A-2C illustrate an interface for determining the missing ingredients in a dish, according to one embodiment. In one embodiment, when the user is missing ingredients for a selected dish, the start button is grayed out and unavailable for the user or the start button is missing, because the dish cannot be cooked until all ingredients are available. In the example of FIG. 2A, a Veggie Kebab dish requires two tomatoes and two mushrooms, but the user only has one tomato. A message of "Missing Ingredients!" notifies the user that the user lacks some of the ingredients to make the dish. In one embodiment, the ingredients that are not available to make the dish are grayed out, while ingredients that are available are presented with an indication that the ingredients are available, such as a colorful icon, a checkmark, or some other indicator.

FIG. 2B illustrates the display presented to the user when the user selects the missing ingredient. A box associated with the missing ingredient is presented, where the box includes three options: "Show Me," "Ask Friends," and visit friend. In one embodiment, a fourth option (not shown) to buy the ingredient is also present. The "Show Me" option, when selected, shows the user how to get the missing ingredient in the game. "Show me" means "show me" in my own game board, by taking the player's avatar to the place in the player's board where the ingredient may be obtained, or via some other animation.

In one embodiment, the ingredient may be obtained by harvesting the ingredient, such as by growing a tomato plant and harvesting the tomato, or by crafting the ingredient in a crafting station (e.g., cooking bread), or by some other game mechanic. In one embodiment, the crafting station is utilized to obtain a crafted ingredient, which in turn requires one or more ingredients to be added during the preparation of the crafted ingredient in the crafting station. In one embodiment, the crafting station is a brick oven and the user may use the brick oven to make bread. In order to make the bread, the user needs to add dough to the oven to make the bread.

In another embodiment, the box associated with the missing ingredient also includes the option of buying the ingredient (not shown in FIG. 2B). If the player selects the buy option, the player is taken to a purchase interface where the player may buy the ingredient with game currency or some other asset.

FIG. 2C shows another exemplary embodiment of a dish with missing ingredients. In order to cook a Grilled Steak Panini, in one embodiment, the player needs one piece of meat, two pieces of bread, and two onions. When the player mouse is over the onions, a box shows two options: a show-me option and a visit-friend option. In this case, no friend of the player has onions, so the game does not display any friends.

It is noted that the embodiments illustrated in FIGS. 1A-1D and 2A-2C are exemplary. Other embodiments may utilize different layouts, different animations, different order of preparation, etc. The embodiments illustrated in FIGS. 1A-1D and 2A-2C should therefore not be interpreted to be exclusive or limiting, but rather exemplary or illustrative.

FIGS. 3A-3D illustrate the operation for visiting a friend in the game, according to one embodiment. FIG. 3A illustrates the GUI when a player visits a friend. In the embodiment of FIG. 3A, the player is visiting a friend named Madeline. In the information bar at the bottom of the game board, the game provides informational messages that the player is visiting, such as "Madeline's Restaurant" and "Now Visiting Madeline." A home button is provided to end the visit and take the avatar back to the game board of the player, also referred to as the home game board.

The friend's board is a game board created by the friend in the game (i.e., the home game board of the friend), and when the player is visiting the friend the player may perform operations therein to help the friend, such as serving dishes, harvesting tomatoes, etc. In exchange for helping the friend, the player gets game rewards such as energy, friendship points, ingredients, etc. While visiting the friend the player's avatar may wander around the friend's board. In the example of FIG. 3A, the player's avatar is sitting at a table in the restaurant.

It is noted that, in one embodiment the game provides a fictitious friend to the player so the player may perform viral operations, even if the player does not have any friends in the game yet. In one embodiment, the visit operation to a real friend provides the same features to the player as a visit operation to the fictitious friend, and in another embodiment, the visit to the fictitious friend may have different features.

In one embodiment, while the player is visiting, the operations that the player may perform are highlighted in some fashion, such as by including arrows pointing to the items that may be clicked and operated upon by the player's avatar. If the player places the mouse cursor over a particular item, in one embodiment, the game provides information about the item and the operations to be performed. In the exemplary embodiment of FIG. 3B, the game shows that the player may obtain mushrooms and game currency if the player helps the friend (e.g., Madeline) to serve a dish. If the player selects this option, the dish will be served to clients in Madeline's restaurant and the player will obtain mushrooms and currency. If the player needed mushrooms to complete a dish, the player may now return back home and cook the dish with the mushrooms.

In one embodiment, another option for getting missing ingredients is through a viral request, which involves asking a friend for the missing ingredient. The viral request is performed inside the game, without sending the request to an external entity outside the game, such as a social network. Once the player selects a friend having the missing ingredient, a request is sent to the friend, which may receive the request in different ways, such as a pop-up message when the friend signs into the game, a message in a message board, the message in a chat, etc. In one embodiment, besides sending a request within the game, a separate notification may be sent to the friend, such as via e-mail, text message, post, or some other form of electronic communication.

Figure 3C:

In one embodiment, the request is presented to the friend via an avatar in the friend's board game with a message describing the request, such as in the embodiment of FIG. 3C. The avatar presented is the avatar of the requester in the game, and the request may also include a picture of the requester. In one embodiment, the message includes a list of available ingredients that may be given to the requester, a first button to visit the game board of the requester, and a second button to get the friend the requested ingredient or ingredients.

In one embodiment, when the friend gifts and ingredient, the count for that ingredient is decreased accordingly for the giver and increased for the recipient. In another embodiment, the ingredient may be shared, and the count of the giver does not decrease while the count for the recipient does increase.

Figure 3D:
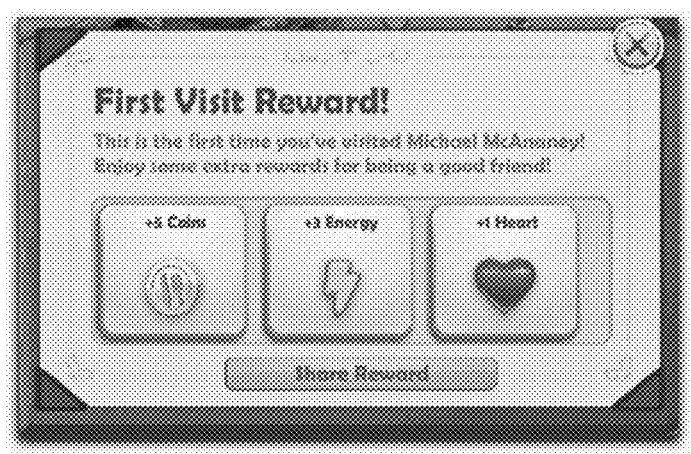

After the player finishes the visit by clicking in the "take me home" button, the game displays a message that includes the reward obtained by the player, such as the exemplary embodiment of FIG. 3D. In this embodiment, the player has obtained 5 coins, 3 units of energy, and 1 unit of heart (which is a metric associated with the strength of the viral help provided by the player).

FIGS. 4A-4E illustrate an interface for reporting regular status of a player, according to one embodiment. In one embodiment, a player becomes a "regular" visitor of a friend (also referred to as the player obtains the status of "regular" or "regular visitor") when the player visits the friend a predetermined amount of times within a predetermined time period (e.g., three times within the last seven days, 5 times in the last 48 hours, etc.).

In one embodiment, the predetermined time period is divided into timeslots and, in one embodiment, the player is only credited with one visit per timeslot, and if the player visits more than once within a timeslot the player only gets credit for one visit. For example, if the time period is 7 days and the timeslot is 1 day, when the player visits the friend three times in the same day, the player only gets credit for one visit in the same day. In another embodiment, the player gets credited for each visit, independent of the frequency of the visits.

When a player becomes a regular, the player may obtain items (e.g., pepper) that are not obtainable in any other way. As long as a player is a regular, the player may continue visiting the friend to continue obtaining the special items. However, if the player falls below the threshold of visits required within the time period, the status of regular is lost by the player, and the player may regain the regular status by meeting the conditions to become a regular again.

In the exemplary embodiments of FIGS. 4A-4E, to obtain a regular status a player must visit a friend at least once a day for at least three different days within the last seven days (the present day plus the previous six days). Using the nomenclature defined above, the period for visiting is 7 days, the time slot is one day, and the required number of visits is at least 3. It is noted that the embodiments illustrated are exemplary. Other embodiments may utilize different time periods (e.g., 30 days, 14 days, 60 days, etc.), different time slots (e.g., day, week, month, year, etc.), different number of visits required, etc. The embodiments illustrated in FIGS. 4A-4E should therefore not be interpreted to be exclusive or limiting, but rather exemplary or illustrative.

Figure 4A:
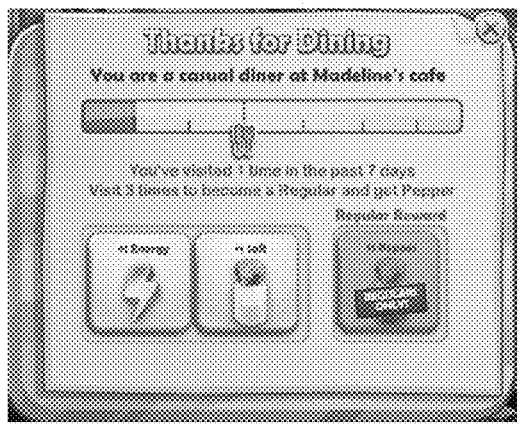
FIGS. 4A-4E illustrate an interface for reporting regular status of a player, according to one embodiment.

FIG. 4A illustrates an embodiment of a rewards message presented to the player after terminating the visit. In this case, the player has visited the friend one-time in the last seven days. A bar with seven slots serves as a visible counter on how many times the player has visited the friend, and in this case one slot has a dark shading while the other slots have a light shading, to indicate that only one visit has taken place in the last seven days. In addition, the message indicates that the player has gained one unit of energy and one unit of salt, an ingredient required in some dishes.

In addition, the message shows a grayed or dimmed icon for pepper, and other ingredients. The pepper is dimmed because this reward is not available to a "casual" (i.e., not regular) visitor. Because the player has only visited once in seven days, the player is not a regular visitor (the player is a casual visitor), and therefore, the player does not get the pepper as reward.

Figure 4B:

FIG. 4B illustrates the rewards message when the player has visited the friend twice in the last seven days. The message is similar to the one in FIG. 4A because the player is still not a regular visitor. Therefore, the player does not get pepper either. The counter bar includes two shaded slots to communicate that the player has two visits in the last seven days. The message also encourages the player to visit again stating "Visit 3 times to become a Regular and get Pepper."

Figure 4C:
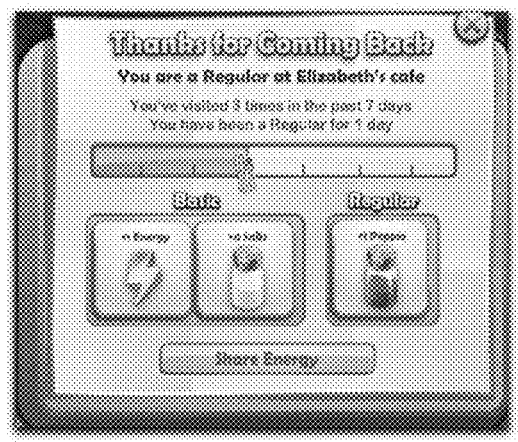

FIG. 4C shows the rewards message after the player has visited three times in the past seven days. Because the player now meets the requirement to become a regular player, the player is treated as a regular and the player gets pepper as a reward. In one embodiment, the reward for being a regular visitor may not be obtained in any other way in the game, and the player that needs the reward for the regular visitor must then become a regular visitor in order to obtain this reward.

The counter bar now includes three shaded slots to indicate that three visits took place during the last seven days. In one embodiment, the colour or shading of the counter bar is different when the player is a casual visitor that when the player is a regular visitor. For example, in one embodiment, the casual visitor gets red slots in the counter bar and the regular visitor gets green slots in the counter bar.

Figure 4D:

As long as the player meets the requirement to be a regular visitor (visiting at least three times in the last seven days) the player will keep getting the special reward for regulars as long as the condition is maintained. For example FIG. 4D shows a rewards message after the player has visited four times within the last seven days.

In one embodiment, the counter bar acts as a simple counter for the number of visits during the last seven days, as seen in FIGS. 4A-4D. For example, if the player is playing on a Sunday, the counter bar will look the same, having two dark slots, if the player has visited on Monday and Wednesday or if the player has visited on Tuesday and Friday.

Figure 4E:
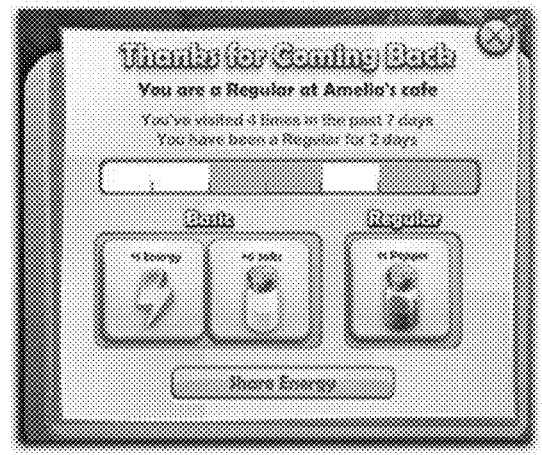

In another embodiment, the counter bar also acts an indicator of which days, within the last seven days, the player visiting the friend, as illustrated in FIG. 4E. This way, the player gets some indication of the history of visits to the friend. In the exemplary embodiment of FIG. 4B, if the first slot corresponds to a Sunday, the bar indicates that the player has visited on Tuesday, Wednesday, Friday, and Saturday, which correspond to the dark slots.

Figure 5:
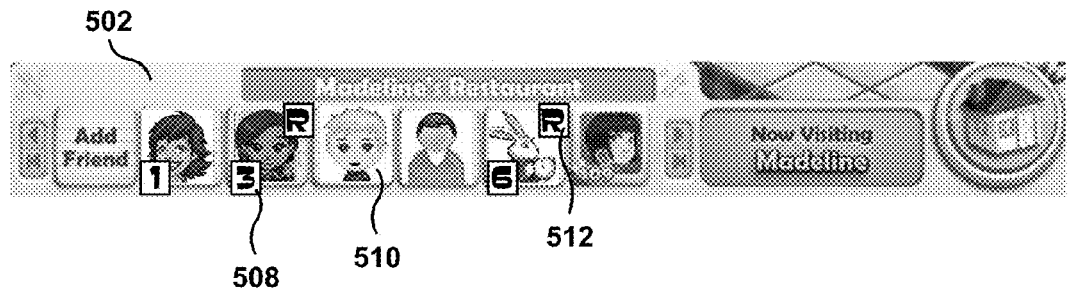
FIG. 5 illustrates a game bar with regular-status indicators, according to one embodiment.

FIG. 5 illustrates a game bar 502 with regular-status indicators 508, according to one embodiment. In one embodiment, the friends displayed in the expandable GUI bar are sorted according to one or more criteria. The criteria includes one or more of a number of mastery stars in the game, level in the game, friends that have been sent a request, friends that have sent a request, number of interactions in the game, number of interactions in a social network, the amount of time that the friend has been a friend in the game, the amount of time that the friend has been a friend in the social network, gender, age, having ingredients that the player needs, etc.

As discussed above with reference to FIG. 1D, the game bar in the GUI includes a list of friends, represented by respective icons 510, photos, or drawings of the friends. In addition, the embodiment of FIG. 5 includes indicators 512 of which friends the player has visited regularly. In other words, for which friends the player has currently a regular visitor status. This information may be useful to the player when the player is in need of the special item (e.g., pepper) that may only be obtained via a visit to a friend that the player has a status of regular visitor.

In addition, some player icons include a counter 508 indicating how many times the player has visited the respective friend. Of course, those players whose counter 508 meet the requirements for being a regular will also have the regular indicator 512. In another embodiment, a separate counter (not shown in FIG. 5) is also presented to indicate those friends that are considered regular visitors of the player.

In one embodiment, when a player has the status of regular visitor with a friend and the friend also has a regular status with the player (i.e., both players are regular visitors of each other) the rewards obtained when visiting each other are increased in order to promote viral interactions. In one embodiment, a special ingredient is available to the player only when the player visits a friend with reciprocal regular-visitor status.

Figure 6:
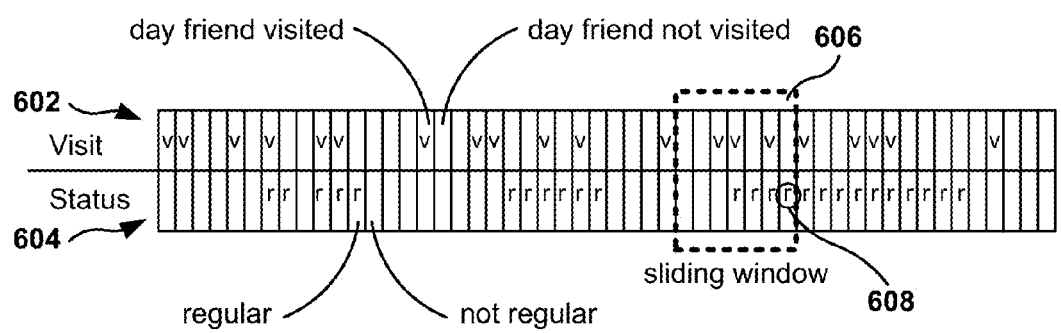
FIG. 6 illustrates one embodiment for determining regular status based on a sliding window of visits, according to one embodiment.

FIG. 6 illustrates one embodiment for determining regular status based on a sliding window of visits, according to one embodiment. In one embodiment, the condition to become a regular visitor is implemented using the concept of a sliding window. The sliding window refers to a window of time that "slides" as new timeslots are added. For example, if the time slot is one day the sliding window moves one day at the beginning of each day. As the days go by, the sliding window moves to cover the required period of time.

In the embodiment of FIG. 6, the condition for being a regular visitor is that the player must visit a friend at least once during at least three different days within the last seven days. Consequently, the sliding window covers seven days because that is the period for calculating the number of visits.

On the top row 602 of FIG. 6, each box indicates whether the player visited the friend or not. If the player visited the friend, the box includes a "v" and if the player did not visit on that day, the box is empty. The second row 604 of FIG. 6 indicates whether the player has achieved the regular status in a given day. If the player has the regular status the corresponding box includes an "r" and if the player does not have the regular status the box is empty.

To determine whether the player is regular on a given date or not, a sliding window 606 is placed covering the given date and the previous six days. The number of visits (number of v's) within the sliding window 606 determines the status for the last box on the bottom row within the sliding window. In the example window 606 of FIG. 6, there are three visits, therefore, the status on the last day 608 is that of a regular visitor.

Figure 7A:
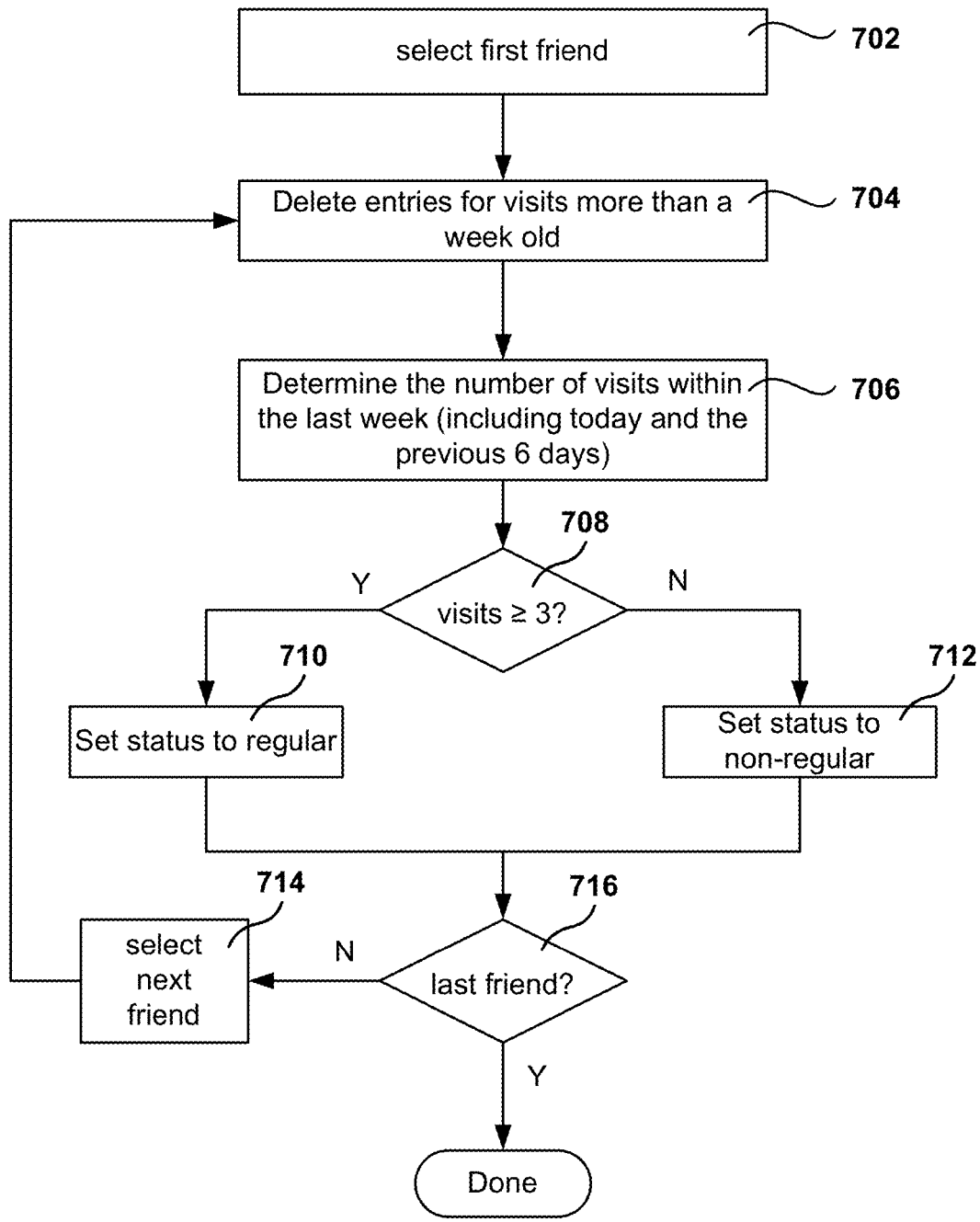
FIG. 7A is a flowchart of a method for determining regular status, in accordance with one embodiment.

FIG. 7A is a flowchart of a method for determining regular status, in accordance with one embodiment. In operation 702, a friend is selected to determine if the player is a regular visitor of the selected friend. From operation 702 the method flows to operation 704, where entries for visits that are more than a week old are deleted. The method described in FIG. 7A is for a method where regular status is obtained when a player visits a friend on at least three days within the last week. This embodiment is exemplary. Other embodiments may utilize different periods, different time slots, and different number of visits within the allowed period for performing all the visits. The embodiments illustrated in FIG. 7A should therefore not be interpreted to be exclusive or limiting, but rather exemplary or illustrative.

From operation 704, the method flows to operation 706, where the number of days where the player visited the friend in the last week is calculated. A check is performed in operation 708, and if the number of days with a visit is greater than or equal to three, then the method flows to operation 710, and to operation 712 if the number of visits is less than three.

In operation 710 the visitor status is set to regular, and in operation 712 the visitor status is set to non-regular, also referred to as casual. In operation 716, a check is made to determine if there are more friends for which the visitor status needs to be calculated, and if the check is positive then the method flows to operation 714, and otherwise the method ends. In operation 714, the next friend for which the visitor status is to be determined is selected. From operation 714 the method flows back to operation 704 to repeat the aforementioned cycle for determining the visitor status.

Figure 7B:
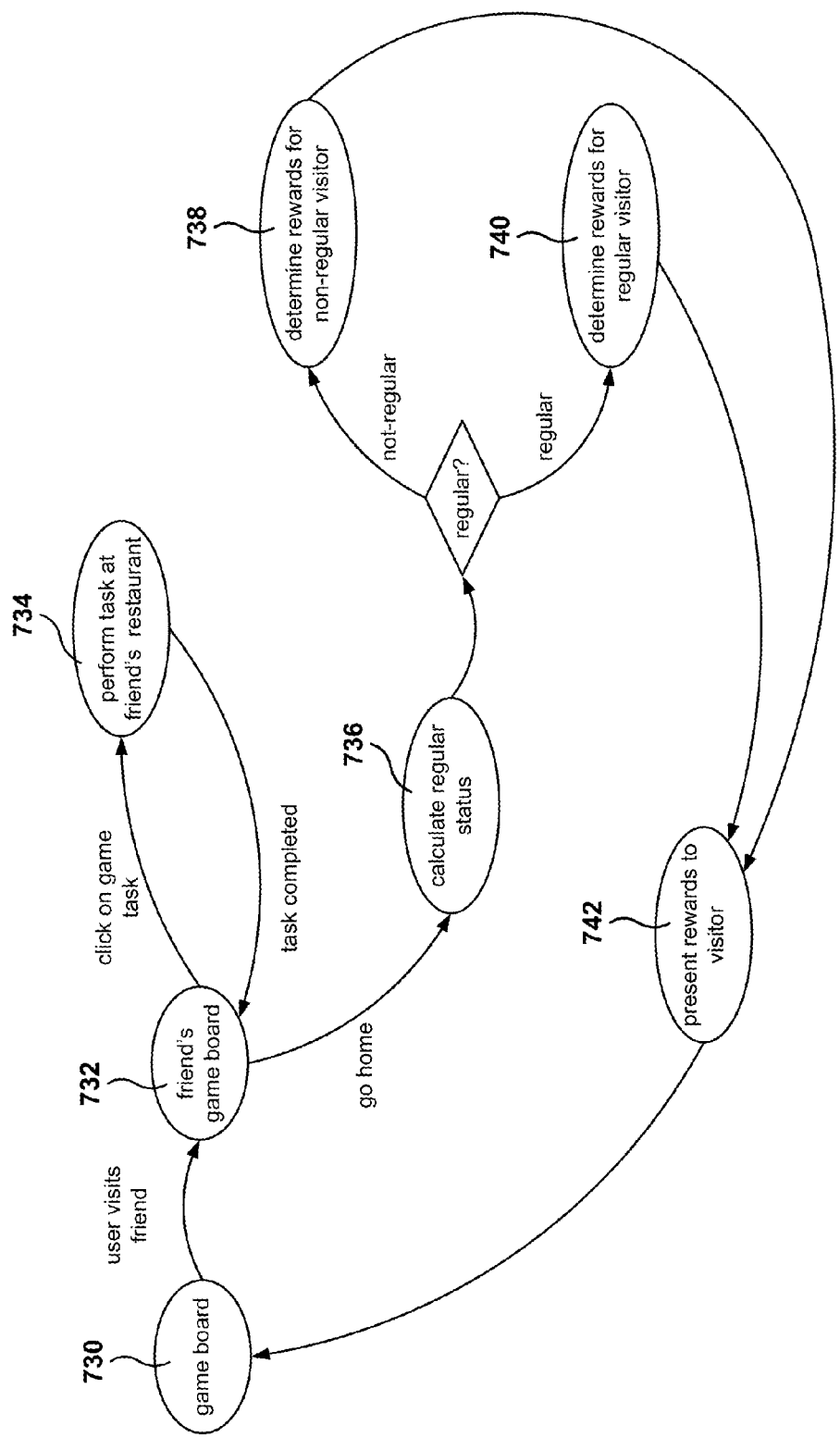
FIG. 7B is a diagram for determining rewards for an in-game visit, according to one embodiment.

FIG. 7B is a diagram for determining rewards for an in-game visit, according to one embodiment. The diagram of FIG. 7B includes a plurality of different game states represented by an elliptical Figure, and a group of arrows representing transactions between the game states. Some of the arrows include a label that indicates the condition that causes the transition from one game state to another.

In state 730, a game board is presented, and in one embodiment the game board represents a restaurant or a café where the game takes place, but other types game boards are also possible. See for example the game board of FIG. 1A. When the user selects to visit a friend, the game transitions to state 732. In one embodiment, the user elects to visit a friend by selecting an icon or photo associated with the friend. The icon or photo may appear in several game interfaces or elements, such as in a game bar, in an avatar associated with the friend, in a recommendation page for obtaining an ingredient that the friend has, etc.

In state 732, the game displays the game board of the friend being visited. The game board of the friend is a game board created by the friend and that includes the elements that have been created, added, purchased, modified, etc., by the friend in the game. While in the friend's game board, the player may perform several actions in order to help the friend and/or get rewards. For example, the player may serve food to clients in the friend's restaurant, water a tomato plant, etc.

While in state 732, if the player performs and in-game task the game transitions to operation 734, where the task is performed at the friend's restaurant. Once the task is completed the game returns to state 732. Further, if the player selects to go home while in state 732, the game transitions to state 736 where the visitor status is calculated for the player. If the player receives the status of regular visitor, the game transitions to state 740 where the rewards are determined based on the regular visitor status of the player. In one embodiment, the player gets an ingredient that is only available to those players that achieve the regular visitor status.

If the player is not a regular player, the game transitions to operation 738 where the rewards are determined for the player without regular status. From state 738 or state 740 the game transitions to state 742, where the determined rewards are given to the player and presented on a display (see for example the embodiments of FIGS. 4A-4E). After the rewards are given to the player, the game transitions back to state 730, and the game displays the game board of the player.

It is noted that the embodiments illustrated in FIG. 7B are exemplary. Other embodiments may utilize different states, interfaces, options, etc. The embodiments illustrated in FIG. 7B should therefore not be interpreted to be exclusive or limiting, but rather exemplary or illustrative.

Figures 8A, 8B:
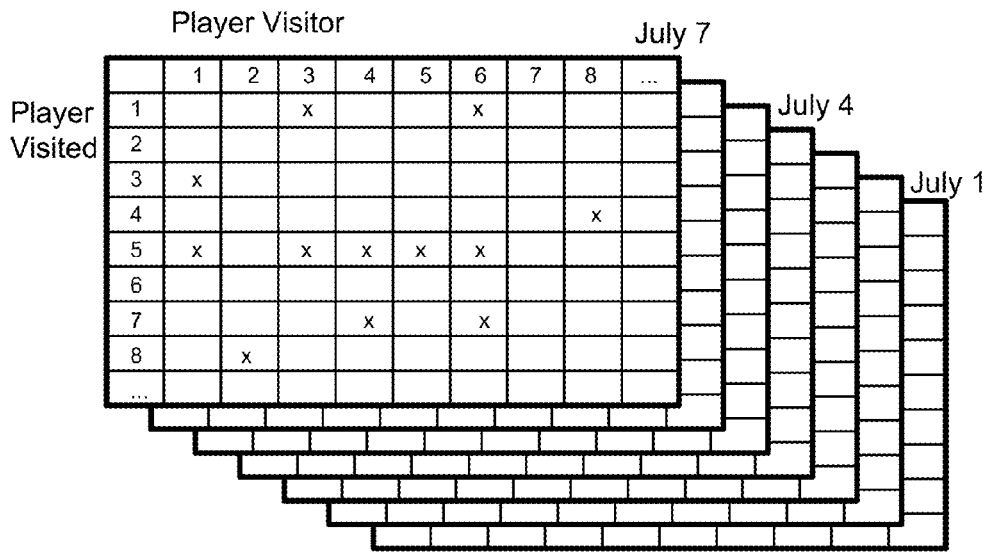
FIGS. 8A-8B illustrate data structures for storing visit information, according to one embodiment.

FIGS. 8A-8B illustrate data structures for storing visit information, according to one embodiment. In one embodiment, the data regarding visits from players to friends is kept in a plurality of matrices. The embodiment of FIG. 8A includes one matrix per day, and only the matrices corresponding to the present date and to the six previous dates are kept, and older matrices are discarded.

There is one row per player being visited ("player visited"), and one column for each visiting players ("player visitor"). Each cell holds a binary value indicating if the "player visitor" visited the "player visited" in the date associated with the matrix. In the embodiment of FIG. 8A, a visit is represented by and "x" and the lack of the visit is represented by a blank cell.

Since there may be millions of users in an MMO, the matrix will be very sparse, this means that a majority of the values will be blanks meaning that no visits have taken place. Therefore, methods for storing sparse matrices may be utilized without having to waste memory space.

In order to calculate the visitor status (regular or non-regular) for a "player visitor" to a "player visited", the game examines the corresponding cell value in each of the matrices corresponding to the last seven days. Adding the number of visits in these cells determines the number of visits, and if the number of visits conforms to the requirement for being a regular player, the "player visitor" is considered a regular visitor of the "player visited," and a non-regular player otherwise.

In the exemplary embodiment of FIG. 8B, a plurality of lists are kept for each player. One list is kept per friend visited by the player and the list includes the dates where the player visited the corresponding friend.

For example, in FIG. 8B the player Joe has visited friends Al, Pete, Dave, etc. By examining the list associated with friend Al, it can be observed that Joe visited Al on May 4, 2013; May 1, 2013; Apr. 7, 2013; Jan. 11, 2013; Jan. 10, 2012; and May 9, 2012. In this embodiment, all the visits are kept in the database, but in another embodiment, cleaning operations eliminate visits than a certain date (e.g., older than one week, older than one month, etc.).

In order to calculate the regular visitor status of the friend, the game examines the list and counts how many times the player has visited within the predetermined time period. In one embodiment, entries older than the predetermined period are raised at the time of calculating visitor status.

In another embodiment (not shown), instead of keeping list for the friends visited by a player, lists are kept for the friends that visited a player. It is noted that the embodiments illustrated in FIGS. 8A and 8B are exemplary. Other embodiments may utilize different data structures, a combination of FIGS. 8A and 8B (e.g., a matrix implemented with linked lists), etc. The embodiments illustrated in FIGS. 8A and 8B should therefore not be interpreted to be exclusive or limiting, but rather exemplary or illustrative.

FIG. 9 is an e-mail sent from the game to a player, where the email includes a recipe obtained in the game, according to one embodiment. In order to improve the fiction of the game, a player that achieves certain milestones in the game may be rewarded with an actual item that may be used outside the game, in real life. For example, in the cooking game, once the player cooks a certain dish a predetermined number of times, the player is said to have mastered the dish. Besides obtaining game rewards, such as Chef Mastery stars, the player also may receive an actual recipe to cook the mastered dish.

In one embodiment, the recipe is sent to the player via e-mail, although other forms of communication are also possible, such as posting the recipe in a social network, providing a website address to access the recipe, providing an interface in the game to print the recipe, etc.

Figure 10:
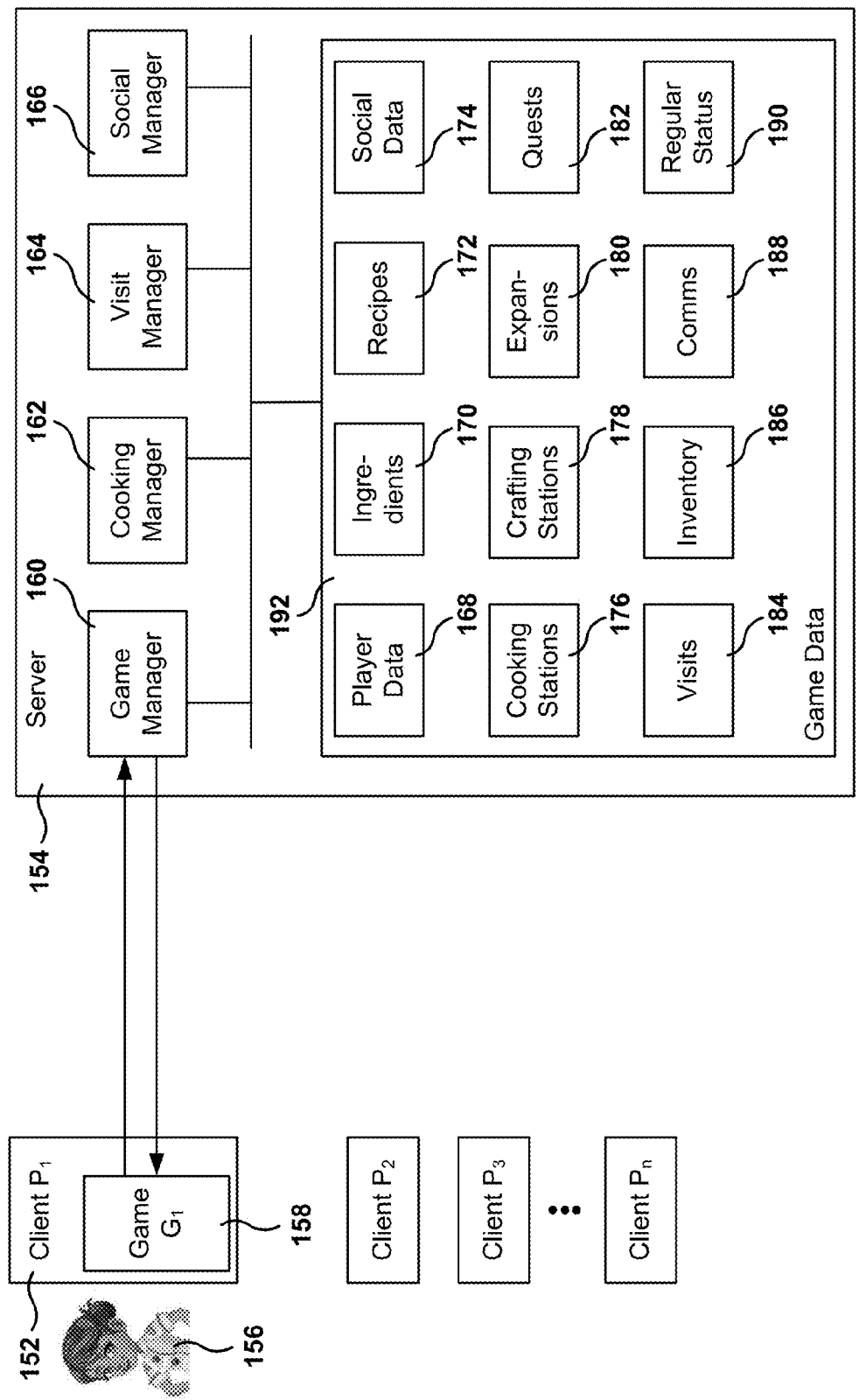
FIG. 10 illustrates the interaction between client and server in an online game, according to one embodiment.

FIG. 10 illustrates the interaction between client and server in an online game, according to one embodiment. In one embodiment, the online game is hosted by server 154, which includes game manager 160, cooking manager 162, visit manager 164, social manager 166, and game data 192. A player $P_1$ 156 plays the game utilizing client device 152 executing a computer program. In one embodiment, the client 152 utilizes a web browser 158, and in another embodiment other computer programs may also be utilized to play the game, such as a computer program loaded on a computing device for the exclusive purpose of playing the game.

In one embodiment, game manager 160 manages the game operations for each of the players, and game manager 160 interacts with other modules to perform respective game operations within the game. In addition, the game manager 160 manages the game data stored for running the player's games, although other modules may also access and change some of the game data. In one embodiment, the functionality implemented by game manager 160 includes presenting the game board to the player (e.g., view of the restaurant), presenting options to the player for customizing and controlling an avatar of the game, being the interface to the player with other game modules, synchronizing game operations with client 152, managing communications with client 152, etc.

Cooking manager 162 manages the cooking operations in the game. In one embodiment, when the player selects a cooking appliance to perform a cooking operation, the cooking manager 162 is invoked by game manager 160. In one exemplary embodiment, the cooking manager presents cooking appliance for cooking dishes, such as the one shown in FIG. 1A.

Visit manager 164 manages visit operations from players to their friends, including enabling operations in the game board of the friend, calculating whether players are regular visitors to one or more friends, etc.

The social manager 166 manages the social interactions of the players, which include determining the social links established within the game and outside the game among the players. For example, the social manager 166 may suggest friends in the social network to the player that may become friends within the game.

Game data 192 represents one or more databases that hold game related data. The game data includes player data 168, ingredients 170 available for making dishes, recipes 172 for the dishes that can be cooked in the restaurant, and social data 174 obtained by social manager 166. The social data 174 includes the relationships established by players in the game within the game, and the relationships existing among the players in one or more social websites.

Game data 192 further includes cooking stations data 176, which define the features, capabilities, dishes that can be cooked, cost, and other data associated with the cooking stations (e.g., a grill). Crafting stations are similar to cooking stations in that they both take ingredients to be processed, but the crafting station produces a new processed ingredient, instead of a finished dish like the cooking station.

Game data 192 further includes information regarding the regular visitor status 190 for the players in the game and their friends.

Expansions data 180 stores the information about possible expansions in the game, and quests data 182 includes different missions that can be started by the player in order to obtain rewards and make progress in the game. Further yet, game data 192 includes information regarding visits 184 to follow players in the game, inventory 186, communications between player 188, etc.

It is noted that the embodiments illustrated in FIG. 10 are exemplary. Other embodiments may utilize different game modules, different data modules, or combine the functionality of one or more modules into a single module. The embodiments illustrated in FIG. 10 should therefore not be interpreted to be exclusive or limiting, but rather exemplary or illustrative.

Figure 11:
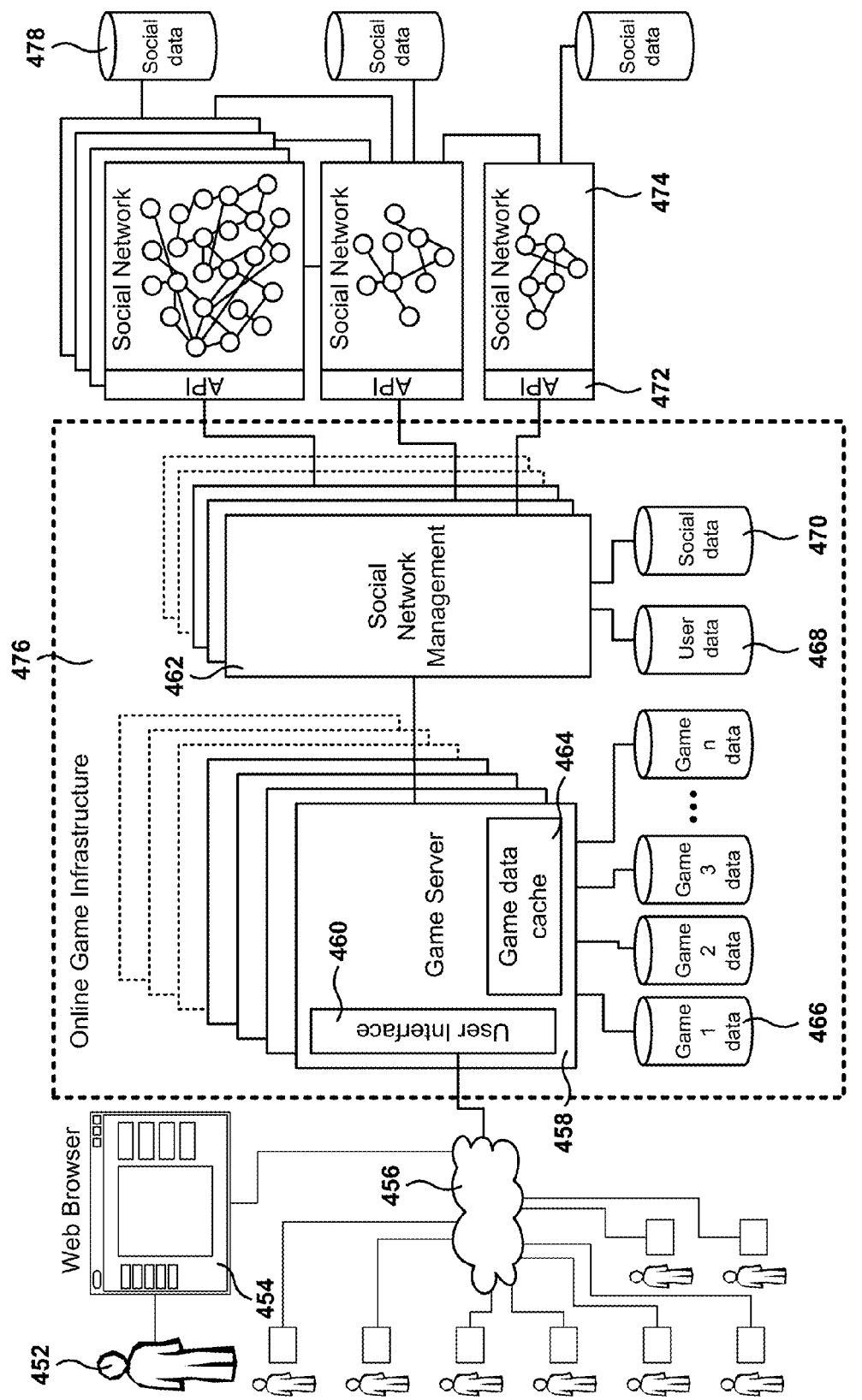
FIG. 11 illustrates an implementation of a Massively Multiplayer Online (MMO) infrastructure, according to one embodiment.

FIG. 11 illustrates an implementation of an online game infrastructure, according to one embodiment. The online game infrastructure 476 includes one or more game servers 458, web servers (not shown), one or more social network management servers 462, and databases to store game related information. In one embodiment, game server 458 provides a user interface 460 for players 452 to play the online game. In one embodiment, game server 458 includes a Web server for players 452 to access the game via web browser 454, but the Web server may also be hosted in a server different from game server 458. Network 456 interconnects players 452 with the one or more game servers 458.

Each game server 458 has access to one or more game databases 466 for keeping game data. In addition, a single database can store game data for one or more online games. Each game server 458 may also include one or more levels of caching. Game data cache 464 is a game data cache for the game data stored in game databases 466. For increased performance, caching may be performed in several levels of caching. For instance, data more frequently used is stored in a high priority cache, while data requiring less access during a session will be cached and updated less frequently.

The number of game servers 458 changes over time, as the gaming platform is an extensible platform that changes the number of game servers according to the load on the gaming infrastructure. As a result, the number of game servers will be higher during peak playing times, and the number of game servers will be lower during off-peak hours. In one embodiment, the increase or decrease of bandwidth is executed automatically, based on current line usage or based on historical data.

One or more social network management servers 462 provide support for the social features incorporated into the online games. The social network management servers 462 access social data 478 from one or more social networks 474 via Application Programming Interfaces (API) 472 made available by the social network providers. An example of a social network is Facebook, but it is possible to have other embodiments implemented in other social networks. Each social network 474 includes social data 478, and this social data 478, or a fraction of the social data, is made available via API 472. As in the case of the game servers, the number of social network management servers 462 that are active at a point in time changes according to the load on the infrastructure. As the demand for social data increases, the number of social network management servers 462 increases. Social network management servers 462 cache user data in database 468, and social data in database 470. The social data may include the social networks where a player is present, the social relationships for the player, the frequency of interaction of the player with the social network and with other players, etc. Additionally, the user data kept in database 468 may include the player's name, demographics, e-mail, games played, frequency of access to the game infrastructure, etc.

It is noted that the embodiment illustrated in FIG. 11 is an exemplary online gaming infrastructure. Other embodiments may utilize different types of servers, databases, APIs, etc., and the functionality of several servers can be provided by a single server, or the functionality can be spread across a plurality of distributed servers. The embodiment illustrated in FIG. 11 should therefore not be interpreted to be exclusive or limiting, but rather exemplary or illustrative.

Figure 12:
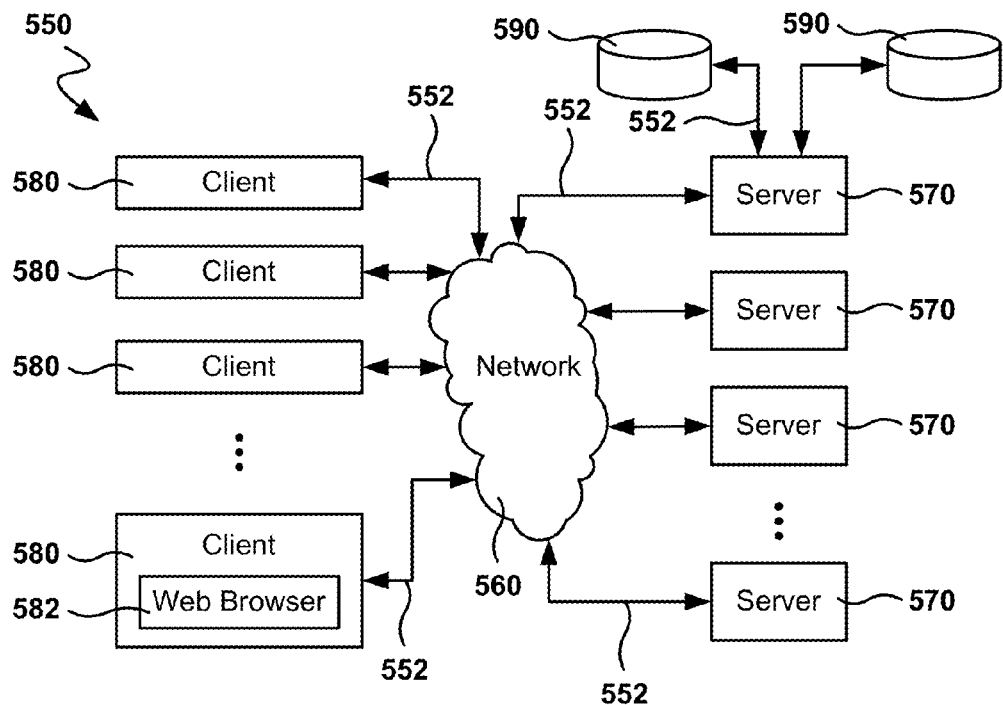
FIG. 12 illustrates an example network environment suitable for implementing embodiments.

FIG. 12 illustrates an example network environment 550 suitable for implementing embodiments. Network environment 550 includes a network 560 coupling one or more servers 570 and one or more clients 580 to each other. In particular embodiments, network 560 is an intranet, an extranet, a virtual private network (VPN), a local area network (LAN), a wireless LAN (WLAN), a wide area network (WAN), a metropolitan area network (MAN), a portion of the Internet, another network, or a combination of two or more such networks 560.

One or more links 552 couple a server 570 or a client 580 to network 560. In particular embodiments, one or more links 552 each includes one or more wired, wireless, or optical links 552. In particular embodiments, one or more links 552 each includes an intranet, an extranet, a VPN, a LAN, a WLAN, a WAN, a MAN, a portion of the Internet, or another link 552 or a combination of two or more such links 552.

Each server 570 may be a stand-alone server or may be a distributed server spanning multiple computers or multiple datacenters. Servers 570 may be of various types, such as, for example and without limitation, jackpot server, web server, news server, mail server, message server, advertising server, file server, application server, exchange server, database server, or proxy server. Each server 570 may include hardware, software, embedded logic components, or a combination of two or more such components for carrying out the appropriate functionalities implemented or supported by server 570. For example, a web server is generally capable of hosting websites containing web pages or particular elements of web pages. More specifically, a web server may host HyperText Markup Language (HTML) files or other file types, or may dynamically create or constitute files upon a request, and communicate them to clients 580 in response to Hypertext Transfer Protocol (HTTP) or other requests from clients 580. A mail server is generally capable of providing electronic mail services to various clients 580. A database server is generally capable of providing an interface for managing data stored in one or more data stores.

In particular embodiments, one or more data storages 590 may be communicatively linked to one or more severs 570 via one or more links 552. Data storages 590 may be used to store various types of information. The information stored in data storages 590 may be organized according to specific data structures. In particular embodiments, each data storage 590 may be a relational database. Particular embodiments may provide interfaces that enable servers 570 or clients 580 to manage, e.g., retrieve, modify, add, or delete, the information stored in data storage 590.

In particular embodiments, each client 580 may be an electronic device including hardware, software, or embedded logic components or a combination of two or more such components and capable of carrying out the appropriate functionalities implemented or supported by client 580. For example and without limitation, a client 580 may be a desktop computer system, a notebook computer system, a notebook computer system, a handheld electronic device, or a mobile telephone. A client 580 may enable a network player at client 580 to access network 580. A client 580 may enable its player to communicate with other players at other clients 580. Further, each client 580 may be a computing device, such as a desktop computer or a work station, or a mobile device, such as a notebook computer, a network computer, or a smart telephone.

In particular embodiments, a client 580 may have a web browser 582, such as Microsoft Internet Explorer, Google Chrome, Or Mozilla Firefox, and may have one or more add-ons, plug-ins, or other extensions. A player at client 580 may enter a Uniform Resource Locator (URL) or other address directing the web browser 582 to a server 570, and the web browser 582 may generate a Hyper Text Transfer Protocol (HTTP) request and communicate the HTTP request to server 570. Server 570 may accept the HTTP request and communicate to client 580 one or more Hyper Text Markup Language (HTML) files responsive to the HTTP request. Client 580 may render a web page based on the HTML files from server 570 for presentation to the user. The present disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in Javascript, Java, Microsoft Silverlight, combinations of markup language and scripts such as AJAX (Asynchronous Javascript and XML), and the like. Herein, reference to a web page encompasses one or more corresponding web page files (which a browser may use to render the web page) and vice versa, where appropriate.

Web browser 582 may be adapted for the type of client 580 where the web browser executes. For example, a web browser residing on a desktop computer may differ (e.g., in functionalities) from a web browser residing on a mobile device. A user of a social networking system may access the website via web browser 582.

Figure 13:
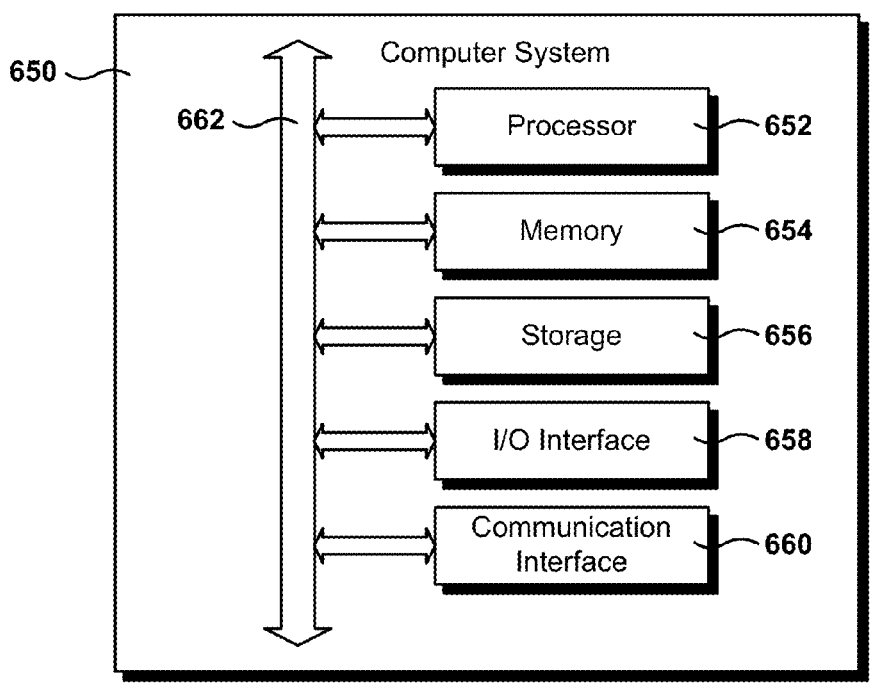
FIG. 13 illustrates an example computer system for implementing embodiments.

FIG. 13 illustrates an example computer system 650 for implementing embodiments. In particular embodiments, software running on one or more computer systems 650 performs one or more operations of one or more methods described or illustrated herein or provides functionality described or illustrated herein. Although methods for implementing embodiments were described with a particular sequence of operations, it is noted that the method operations may be performed in different order, or the timing for the execution of operations may be adjusted, or the operations may be performed in a distributed system by several entities, as long as the processing of the operations are performed in the desired way.

As example and not by way of limitation, computer system 650 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 650 may include one or more computer systems 650; be stand-alone or distributed; span multiple locations; span multiple machines; or reside in a cloud, which may include one or more cloud components in one or more networks. The one or more computer systems 650 may perform in real time or in batch mode one or more operations of one or more methods described or illustrated herein.

In particular embodiments, computer system 650 includes a processor 652, memory 654, storage 656, an input/output (I/O) interface 658, a communication interface 660, and a bus 662. Although this disclosure describes and illustrates a particular computer system having a particular number of particular components in a particular arrangement, embodiments may be implemented with any suitable computer system having any suitable number of any suitable components in any suitable arrangement.

In particular embodiments, processor 652 includes hardware for executing instructions, such as those making up a computer program. As an example and not by way of limitation, to execute instructions, processor 652 may retrieve (or fetch) the instructions from an internal register, an internal cache, memory 654, or storage 656; decode and execute them; and then write one or more results to an internal register, an internal cache, memory 654, or storage 656. The present disclosure contemplates processor 652 including any suitable number of any suitable internal registers, where appropriate. Where appropriate, processor 652 may include one or more arithmetic logic units (ALUs); be a multi-core processor; or include one or more processors 652. Although this disclosure describes and illustrates a particular processor, this disclosure contemplates any suitable processor.

In particular embodiments, memory 654 includes main memory for storing instructions for processor 652 to execute, or data that can be manipulated by processor 652. As an example and not by way of limitation, computer system 650 may load instructions from storage 656 or another source (such as, for example, another computer system 650) to memory 654. Processor 652 may then load the instructions from memory 654 to an internal register or internal cache. During or after execution of the instructions, processor 652 may write one or more results (which may be intermediate or final results) to the internal register or internal cache. Processor 652 may then write one or more of those results to memory 654. One or more memory buses (which may each include an address bus and a data bus) may couple processor 652 to memory 654. Bus 662 may include one or more memory buses, as described below. One or more memory management units (MMUs) reside between processor 652 and memory 654 and facilitate accesses to memory 654 requested by processor 652. Memory 654 includes random access memory (RAM).

As an example and not by way of limitation, storage 656 may include a Hard Disk Drive (HDD), a floppy disk drive, flash memory, an optical disc, a magneto-optical disc, magnetic tape, or a Universal Serial Bus (USB) drive or a combination of two or more of these. Storage 656 may include removable or non-removable (or fixed) media, where appropriate. In particular embodiments, storage 656 includes readonly memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these.

In particular embodiments, I/O interface 658 includes hardware, software, or both providing one or more interfaces for communication between computer system 650 and one or more I/O devices. One or more of these I/O devices may enable communication between a person and computer system 650. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these.

Communication interface 660 includes hardware, software, or both providing one or more interfaces for communication between computer system 650 and one or more other computer systems 650 on one or more networks. As an example and not by way of limitation, communication interface 660 may include a network interface controller (NIC) or network adapter for communicating with an Ethernet or other wire-based network or a wireless NIC (WNIC) or wireless adapter for communicating with a wireless network, such as a WI-FI network. As an example, computer system 650 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these.

In particular embodiments, bus 662 includes hardware, software, or both coupling components of computer system 650 to each other. As an example and not by way of limitation, bus 662 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 662 may include one or more buses 662, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure that may store a computer program or data. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a Secure Digital card, a Secure Digital drive, or another suitable computer-readable storage medium or a combination of two or more of these, where appropriate. Herein, reference to a computer-readable storage medium excludes any medium that is not eligible for patent protection under 35 U.S.C. §101.

Figure 14A:
FIGS. 14A-14D illustrate an interface for serving customers in a restaurant, according to one embodiment.
Figure 14B:
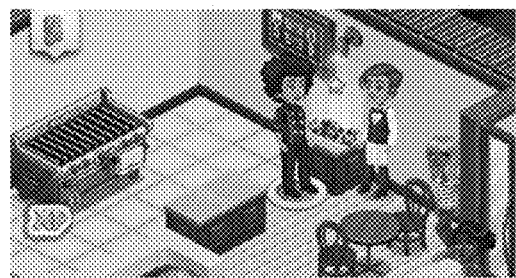

FIGS. 14A-14D illustrate an interface for serving customers in a restaurant, according to one embodiment. FIG. 14A illustrates an example of a user interface to notify the user that the cooking of the dish is complete. In one embodiment, once the user selects the disk on the appliance, the dish is moved to a serving tray or serving area, where a waiter is able to take the dishes from the serving area to the customers of the restaurant. See also FIG. 14B showing food on a serving table that is ready for restaurant customers.

In one embodiment, a game bar in the GUI includes a list of friends, represented by respective icons, photos, or drawings of the friends, and a menu of game options, such as go to the market, see the game inventory, social area, gifts, etc. The game bar is expandable and has a variable number of friends, where the number of friends presented depends on one or more factors, such as how many friends the player has in the game, the current screen size where the GUI is being displayed, the game elements being displayed at a certain time (e.g., the presence of a chat window for chatting with other players may decrease the size of the game bar), etc.

In some embodiments, slots for adding friends (e.g. "Add Friend") are presented in the expandable game bar, and if the player clicks on the "Add Friend" slot then a user interface is presented to add a new friend for the player in the game. The interface may include sending an invitation to the friend via intra-game communications or via an external website, such as a social network. In one embodiment, the number of slots for adding friends is limited to one slot, while in other embodiments the GUI bar may include more than one slot for adding friends.

In one embodiment, when the player clicks in one of the friends in the game bar, the game initiates a visit to the selected friend. A visit to the game board of the friend includes transporting the avatar of the player to the game board of the friend, and enabling the player to perform game operations within the game board of the friend being visited.

Figure 14C:

FIG. 14B illustrates the finished dish sitting on a serving tray and ready to be served. An NPC waiter and an avatar associated with the player are standing near the serving tray. In one embodiment, when the player clicks on a customer in the restaurant, the waiter takes the dish to the customer, as illustrated in FIG. 14C, where the waiter is taking food to a customer. In addition, FIG. 14C includes a customer with a bubble above her head, indicating that the customer wants food.

Figure 14D:

FIG. 14D shows the game board created by a player in the game. In this game board, there are multiple cooking stations, multiple seating areas for customers, and several customers asking for food, as indicated by the bubbles above their heads. When the player clicks in one of the customers asking for food, and animation takes place and the waiter takes the requested food to the customer. After a period of time, which simulates the time required for the customer to eat the food, the customer ends the meal, leaves the restaurant, and rewards are given to the player for feeding the customer.

It is noted that the embodiments illustrated in FIGS. 14A-14D are exemplary. Other embodiments may utilize different layouts, different animations, different order of preparation, etc. The embodiments illustrated in FIGS. 14A-14D should therefore not be interpreted to be exclusive or limiting, but rather exemplary or illustrative.

FIGS. 15A-15D illustrate operations for delivering special VIP services to VIP customers, according to one embodiment. A VIP service is a non-food related service provided to a customer of a restaurant. For example, the VIP service may include the delivery to the table of music, roses, phones, TV, newspapers, books, magazines, taking a photo, etc. The VIP service enhances the restaurant experience of the customer, and when the VIP service is satisfied, the player gets special rewards.

The term VIP is used herein to name a special request, which is non-food related, but other embodiments may utilize other names, such as "additional services," "add-on services," "complementary services," "non-food services," etc. The term VIP should therefore be considered exemplary and not limiting.

Further, the term "VIP customer" is used to differentiate regular customers from customers making VIP requests, but in another embodiment, any customer of the restaurant may request a non-food related service.

In order to satisfy the VIP request (e.g., music), the player must perform a non-cooking operation, such as a hiring a violinist to satisfy the music request. In one embodiment, the VIP requests are not available until the player achieves a predetermined level of expertise in the game. When the player meets the requirement for providing VIP services, the VIP requests start appearing in the game.

Figure 15A:
FIGS. 15A-15D illustrate operations for delivering special VIP services to VIP customers, according to one embodiment.
Figure 15B:
Figure 15C:

FIG. 15A shows a restaurant where a customer is making a VIP request. In this exemplary embodiment, the customer is asking for flowers to be delivered to the table, and an icon inside a bubble above the head of the customer shows a rose. FIG. 15B shows a close-up of another customer making the VIP request for flowers.

In one embodiment, if the player clicks on the VIP request bubble, a new bubble is presented to the player with the message "Click to VIP Serve," and a first icon of a rose with a counter, to indicate that one rose asset is needed to satisfy the request. In addition, a second icon of a thumbs-up sign is presented with a second counter to indicate the reward, which is getting a recommendation (represented by the thumbs up). The recommendation is a a special type of reward utilized for unlocking certain game features, such as adding new expansion areas to the game board of the player. In other embodiments, other types of rewards are also possible for satisfying the VIP request, such as new recipes or new ingredients for cooking.

Figure 15D:

If the player selects the option to fulfill the VIP request, a new GUI is presented to enable the player to fulfill the request. For example, the player may be taken to the market to buy an item to satisfy the request (e.g., flowers), or the player may be taken to an interface to use one item from inventory. After the satisfaction of the VIP request, and animation takes place to satisfy the VIP request. For example, FIG. 15D illustrates the satisfaction of the VIP request, with the animation of an NPC delivering flowers to the customer's table.

Figure 16:
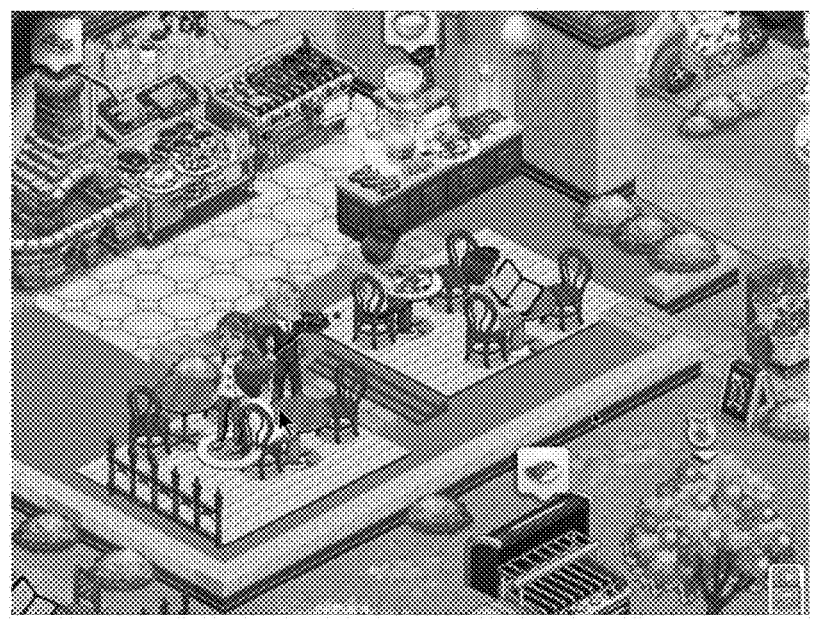
FIG. 16 illustrates a VIP service for the delivery of music to a restaurant table, according to one embodiment.

FIG. 16 illustrates a VIP service for the delivery of music to a restaurant table, according to one embodiment. In one embodiment, the VIP request is for music to be played next to the restaurant table. The icon for the VIP request is a violin (similar to the violin shown in FIG. 17). If the player delivers the VIP service, and animation takes place to deliver the music service to the table. In one embodiment, an NPC around the table plays the violin, while violin music is played in the background.

The VIP service is highly fiction relevant and provides a different game activity for the player other than cooking. For example, in the cooking game there may be some long waits for the dishes to cook, and satisfying VIP requests gives the player something to do while the food cooks. In one embodiment, VIP services also encourage the player to engage in viral interactions by having to visit friends to obtain the assets required to satisfy the VIP requests.

Figure 17:
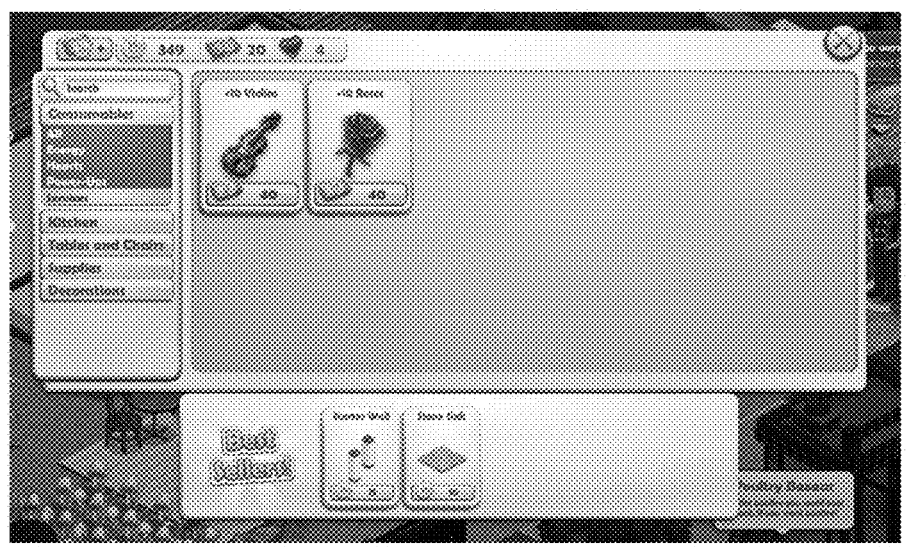
FIG. 17 illustrates an interface for purchasing items used to provide VIP services, according to one embodiment.

FIG. 17 illustrates an interface for purchasing items used to provide VIP services, according to one embodiment. After the player selects the option to go to the market, a place where assets may be bought in exchange for game currency, a plurality of options is presented to purchase different types of assets. In the embodiment of FIG. 17, under the category Consumables there is another category labeled Services.

If one embodiment, the services category in the market includes an option for buying a violin (which represents delivering a music service), and an option for buying flowers (which represents delivering flowers to the customer in the restaurant). Each of the service items for sale include a price (e.g., 40 units of game currency). In another embodiment, the assets required to satisfy the VIP requests may be obtained from friends, such as by sending viral requests or by visiting the friend, etc.

It is appreciated that the embodiments illustrated in FIG. 17 are exemplary. Other embodiments may utilize different services, different icons, different prices, etc. The embodiments illustrated in FIG. 17 should therefore not be interpreted to be exclusive or limiting, but rather exemplary or illustrative.

Figure 18A:
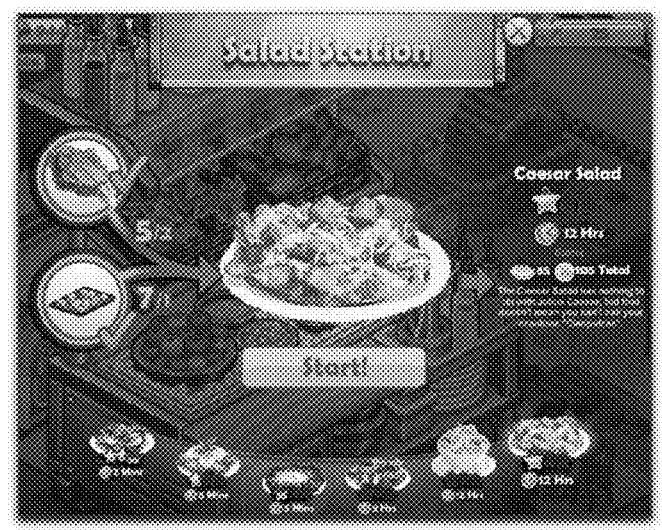
FIGS. 18A-18C illustrate embodiments for crafting stations and the preparation of crafting ingredients.
Figure 18B:
Figure 18C:
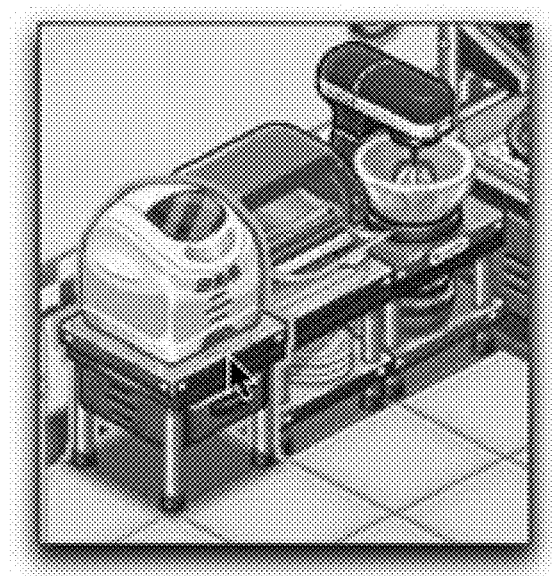

FIGS. 18A-18C illustrate embodiments for crafting stations and the preparation of crafting ingredients. Crafting stations are similar to cooking stations in that crafting stations and cooking stations take ingredients to be processed, but the crafting station produces a new processed ingredient, instead of a finished dish like the cooking station. The ingredient produced by the crafting station may be utilized in a cooking station to make a dish.

Therefore, as used herein, a cooking station refers to an element in the game where dishes can be cooked for serving to restaurant customers. The cooking station takes one or more ingredients and processes the ingredients to make the dish. A crafting station refers to an element in the game where ingredients may be combined or processed in order to produce a new ingredient to be used in a cooking station, or in another crafting station.

In one embodiment, a hybrid grafting/cooking station is able to create dishes for serving to customers and able to create ingredients to be used in a cooking station. For example, a mixer may be utilized to combine liquids in order to make a drink that can be served to customers, and the mixer may also be utilized to create a sauce to be used in a cooking station to prepare a dish.

FIG. 18A presents a cooking station for making salads, referred to herein as a Salad Station. The recipe for Caesar salad requires two units of lettuce and one unit of croutons. Croutons are crafted ingredients, because croutons need to be made in a crafting station, in this case a toaster crafting station. Therefore, the player who wants to make a Caesar salad must go to the toaster first. In the toaster, the player utilizes bread as an ingredient to make croutons.

FIG. 18B illustrates a crafting station for a bread maker. For example, the bread maker takes dough and yeast in order to make Artisan bread. The crafter Artisan bread may be used to make sandwiches in a cooking station that makes sandwiches.

FIG. 18C shows a close-up of a restaurant that includes the crafting stations of a bread machine, a toaster, and a mixer. As discussed above, the bread machine makes bread be used in sandwiches, the toaster makes croutons for a Caesar salad, and the mixer combines ingredients for creating sauces and other items.

It is appreciated that the embodiments illustrated in FIGS. 18A-18C are exemplary. Other embodiments may utilize different crafting stations, cooking stations, recipes, etc. The embodiments illustrated in FIGS. 18A-18C should therefore not be interpreted to be exclusive or limiting, but rather exemplary or illustrative.

Figure 19:
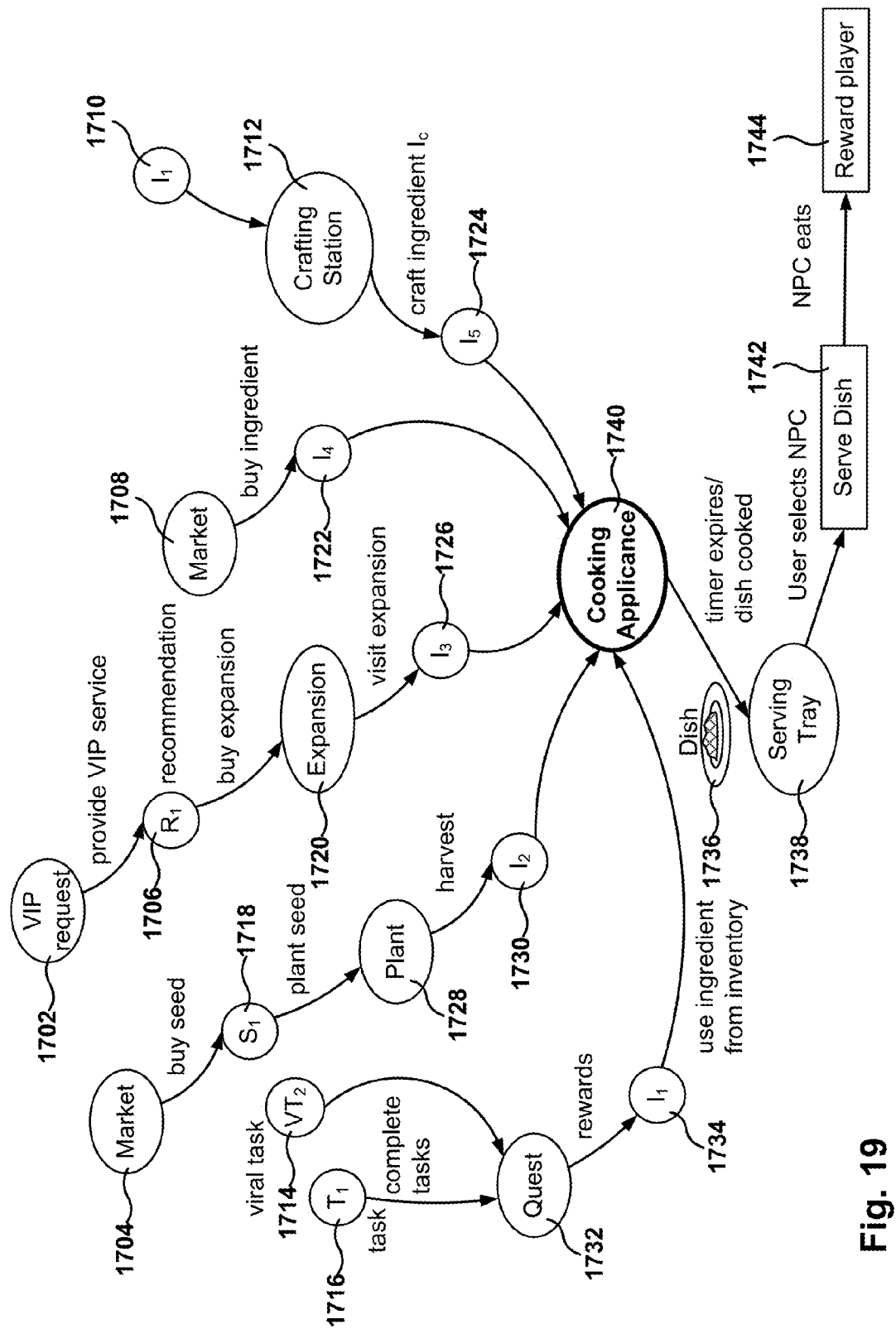
FIG. 19 is a diagram for obtaining ingredients to be used in recipes, according to one embodiment.

FIG. 19 is a diagram for obtaining ingredients to be used in recipes, according to one embodiment. FIG. 19 is an exemplary diagram illustrating some of the ways to obtain ingredients for cooking, but the diagram is not meant to be limiting, and some of the details have been omitted for simplicity of description. Additionally, the list of methods for obtaining ingredients is not meant to be exhaustive, and other methods for obtaining ingredients may be utilized in the online game.

Ingredient $I_1$ 1734 is obtained as the reward for completing quest 1732. The quest is completed by performing one or more tasks in the game, and the tasks may be an in-game task $T_1$ 1716, which is performed by the player in the player's game board, or a viral task $VT_2$ 1714 which is completed via viral interaction with friends of the player in the online game.

Ingredient $I_2$ is obtained by harvesting a plant 1728 that the player has grown in the player's board game. In one embodiment, the plant has been grown from a seed $S_1$ 1718, which the player has obtained in the market 1704 or via some other game operation (not shown, such as a gift from a friend, a viral interaction, etc.).

Another ingredient $I_3$ 1726 is obtained by visiting a expansion 1720 unlocked by the player in the player's board. In one embodiment, expansion 1720 is obtained by accumulating the necessary number of recommendations $R_1$ 1706 required to unlock the expansion 1720, but other methods for unlocking expansions are also possible. In one embodiment, recommendation $R_1$ 1706 may be obtained by satisfying a VIP request 1702, as described above with reference to FIGS. 15A-15C, 4, etc.

Ingredient $I_4$ 1722 can be purchased by the player in market 1708, and ingredient $I_5$ 1724 may be crafted in crafting station 1712. As previously described, crafting station 1712 utilizes one or more ingredients $I_6$ 1710 to prepare the crafted ingredient $I_5$ 1724.

Cooking appliance 1740 takes one or more ingredients $I_1$-$I_5$, and after the required cooking time, cooking appliance 1740 delivers a dish 1736 that can be served to customers. Dish 1736 is placed in serving tray 1738, or in some other service area, ready to be selected by the player to be served. In one embodiment, when the player selects an NPC in the game waiting to be served, the selected dish is served 1742, and after a period of time that simulates the NPC eating the dish, a reward is given to the player 1744.

Figure 20:
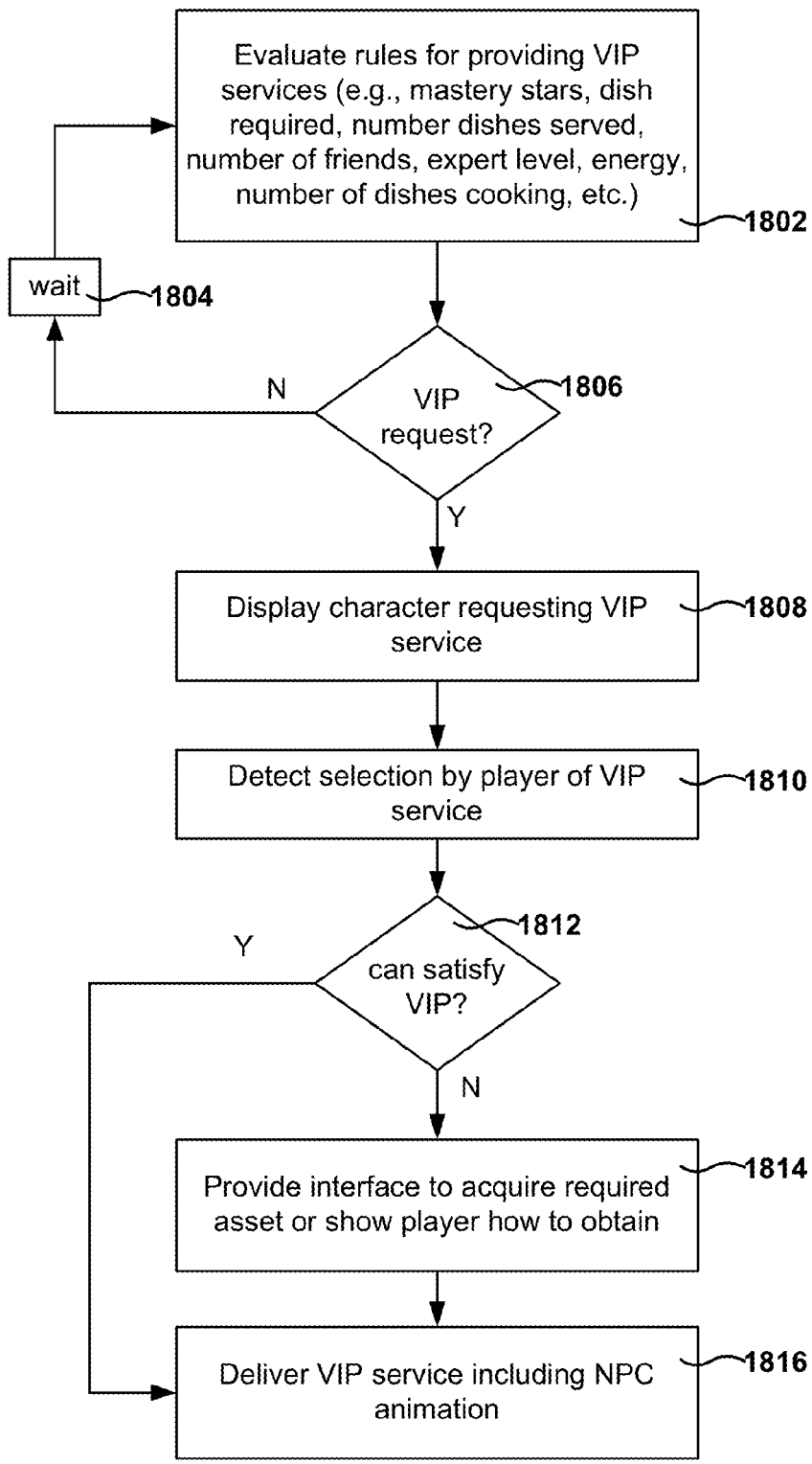
FIG. 20 is a flowchart of a method for the delivery of VIP services, in accordance with one embodiment.

FIG. 20 is a flowchart of a method for the delivery of VIP services, in accordance with one embodiment. In operation 1802, the rules for providing VIP services are evaluated in order to determine if a VIP request should be presented in the game. The rules for evaluating whether to provide VIP services may include one or more of the number of chef mastery stars obtained in the game, having completed one or more requested dishes in the game, having at least a predetermined amount of friends in the game, having reached a predetermined level in the game, having a certain amount of energy, having met a required minimum for the number of dishes that have been cooked by the player, having met a required minimum for the number of different dishes that the player has cooked in the game, etc.

In operation 1806, a check is made to determine if the valuation of the rules produces the result to present a VIP request in the game. If the determination in operation 1806 is positive, the method flows to operation 1808, and if the determination in operation 1806 is negative, the method flows to operation 1804. In operation 1804, the method waits for a period of time before flowing back to operation 1802 to reevaluate the rules for providing VIP services.

In operation 1808, one or more NPCs in the game (which are customers of a restaurant) present a request for a VIP service. In operation 1810, a selection by the player for providing the VIP service is detected, and the method continues to operation 1812, where a check is made to determine if the player is able to satisfy the VIP request without acquiring more game assets.

If the player is able to satisfy the VIP request without needing more game assets, the method flows to operation 1816, but if the player needs to acquire additional assets (e.g., flowers or a violinist) the method flows to operation 1814. The game provides an interface to acquire the assets or assets needed to satisfy the request. In one embodiment, the game shows the player how to obtain the needed asset. For example, the game may show the player that the player needs to visit a friend to obtain this asset or that the player must go to the market to buy the asset.

From operation 1814, the method flows to operation 1816, where the VIP service is delivered to the restaurant customer. In one embodiment, the delivery of the VIP service includes an animation, such as having a musician play music, or having a delivery person bring flowers to the table.

It is noted that the embodiments illustrated in FIG. 20 are exemplary. Other embodiments may utilize different rules, different ways to present or service VIP requests, etc. The embodiments illustrated in FIG. 20 should therefore not be interpreted to be exclusive or limiting, but rather exemplary or illustrative.

FIG. 21 is a data structure for storing ingredient data, according to one embodiment. In one embodiment, the data related to each ingredient is stored in a data structure 1902. The data structure includes the following fields: cost 1, cost 2, difficulty level, harvest, expansion, crafted, quest, available as generic reward, recipes, giftable, available as reward for visiting a friend, request from a friend, requiring regular visitor status, mastery level required, etc.

Cost 1 refers to the cost to purchase the ingredient. For example, the ingredient may be bought with game currency. Cost 2 refers to another way of purchasing the item, such as utilizing a second type of currency within the game. The difficulty level is an indicator of how hard is to obtain this ingredient. Game designers may choose to make some ingredients harder to obtain, while other ingredients might be easier to obtain and readily available to even the beginner player.

The harvest field indicates if the ingredient may be harvested and picked from a plant or tree in the player's garden. The expansion field indicates whether this ingredient may be obtained in an expansion area. In one embodiment, the expansion area includes a source for ingredients, such as a building where the ingredients are stored within the expansion. For example, an expansion may be a bakery or a delicatessen.

The crafted field is a binary flag which indicates whether this ingredient has to be crafted in a crafting station. In other words, one or more ingredients are utilized in a crafting station that creates a new crafted ingredient, which may be used to cook dishes in a cooking station. The quest field indicates if there is zero or more quests in the game that would give this ingredient as a reward when the quest is completed (e.g., the quest may be to start a farm and the reward may be bread).

Some ingredients may be available as generic rewards to be delivered when the player completes quests. For example, some quests may not be tied to specific rewards, and the game may calculate which rewards the player will get for finishing the quest, based on different factors such as the needs of the player, the difficulty to obtain some ingredients, to encourage the player to perform certain actions in the game, etc.

The recipes field includes one or more recipes that utilize the ingredient. The giftable field is a Boolean value that indicates whether this ingredient may be gifted from one player to another. The field "available for visiting friend" is a Boolean value that indicates whether this ingredient may be obtained when the player visits the game board of another player.

The requestable field indicates whether this ingredient may be requested from friends of the player, and the regular-status-only field indicates if the ingredient is available only for those players that achieve the regular visitor status in the game. The mastery-level-required field indicates whether a certain level of mastery in the game (i.e., expertise in the game) must be obtained before the ingredient may be acquired by the player.

It is noted that the embodiments illustrated in FIG. 21 are exemplary. Other embodiments may utilize different fields, organize the fields in a different order, utilized additional fields, etc. The embodiments illustrated in FIG. 21 should therefore not be interpreted to be exclusive or limiting, but rather exemplary or illustrative.

One or more embodiments can also be fabricated as computer readable code on a non-transitory computer readable medium. Herein, reference to software may encompass one or more applications, bytecode, one or more computer programs, one or more executables, one or more instructions, logic, machine code, one or more scripts, or source code, and vice versa, where appropriate.

The present disclosure encompasses all changes, substitutions, variations, alterations, and modifications to the example embodiments herein that a person having ordinary skill in the art would comprehend.

What is claimed is:

1. A method for executing a game, the method comprising:
  providing a graphical user interface (GUI) for a first player in the game, the GUI including a first game board of the first player, wherein the game identifies a plurality of slots in a timeline and identifies a sliding window that includes a predetermined number of most recent time slots;
  detecting visits by the first player to a second game board of a second player in the game, wherein the first game board is different from the second game board;
  determining a number of time slots in the sliding window where the first player visited the second game board;
  assigning the first player a regular visitor status when the number of time slots in the sliding window is equal to or greater than a predetermined threshold, and assigning the first player a non-regular visitor status when the number of time slots is less than the predetermined threshold;
  displaying on the GUI a bar that includes a fragment for each time slot in the sliding window, each fragment indicating if the first player visited the second player in the respective time slot; and
  giving the first player a special reward when the first player has the regular visitor status, wherein the special reward is not given to the first player when the first player has the non-regular visitor status, wherein operations of the method are executed by a processor.

2. The method as recited in claim 1, wherein each time slot is one day, wherein the sliding window includes a fixed number of consecutive days.

3. The method as recited in claim 1, wherein each fragment is presented with a format indicating if the associated time slot includes a visit from the first player to the second game board.

4. The method as recited in claim 1, wherein the GUI further includes a representation of the number of time slots in the sliding window where the first player visited the second game board.

5. The method as recited in claim 1, further including:
  determining that the first player has lost the regular visitor status; and
  reassigning the first player the regular visitor status when a second determination is made that the first player has visited the second game board in the sliding window at least the number of times equal to or greater than the predetermined threshold.

6. The method as recited in claim 1, wherein the GUI during the visit by the first player transports an avatar of the first player to the second game board, and the game enables the avatar to perform game operations in the second game board.

7. The method as recited in claim 1, further including:
  determining that the second player has acquired a regular visitor status for visiting the first game board; and
  assigning the first player and the second player a reciprocal regular visitor status when the first player and the second player have the regular visitor status simultaneously, wherein a second special reward may be obtained in the game by achieving the reciprocal regular visitor status.

8. The method as recited in claim 1, wherein the special reward includes sending the first player and email with a cooking recipe.

9. The method as recited in claim 1, wherein the first game board is created when the first player plays the game for a first time, wherein the second game board is created when the second player plays the game for a first time for the second player.

10. The method as recited in claim 1, wherein the sliding window encompasses a week and each time slot is one day, the method further including:
  recalculating each day if the first player has the regular visitor status, the recalculating including,
    moving the sliding window forward one day;
    determining the number of time slots where the first player has visited the second game board within the sliding window;
    assigning the first player the regular visitor status when the number of time slots is equal to or greater than the predetermined threshold; and
    assigning the first player the non-regular visitor status when the number of time slots is less than the predetermined threshold.

11. A non-transitory computer-readable storage medium storing a computer program for executing a game, the computer-readable storage medium comprising:
  program instructions for providing a graphical user interface (GUI) for a first player in the game, the GUI including a first game board of the first player, wherein the game identifies a plurality of slots in a timeline and identifies a sliding window that includes a predetermined number of most recent time slots;
  program instructions for detecting visits by the first player to a second game board of a second player in the game, wherein the first game board is different from the second game board;
  program instructions for determining a number of time slots in the sliding window where the first player visited the second game board;
  program instructions for assigning the first player a regular visitor status when the number of time slots in the sliding window is equal to or greater than a predetermined threshold, and assigning the first player a non-regular visitor status when the number of time slots is less than the predetermined threshold;

program instructions for displaying on the GUI a bar that includes a fragment for each time slot in the sliding window, each fragment indicating if the first player visited the second player in the respective time slot; and program instructions for giving the first player a special reward when the first player has the regular visitor status, wherein the special reward is not given to the first player when the first player has the non-regular visitor status.

12. The non-transitory computer-readable storage medium as recited in claim 11, wherein each time slot is one day, wherein the sliding window encompasses a week.

13. The non-transitory computer-readable storage medium as recited in claim 11, wherein each fragment is presented with a format indicating if the associated time slot includes a visit from the first player to the second game board.

14. The non-transitory computer-readable storage medium as recited in claim 11, further including:
   program instructions for determining that the first player has lost the regular visitor status; and
   program instructions for reassigning the first player the regular visitor status when a second determination is made that the first player has visited the second game board in the sliding window at least the number of times equal to or greater than the predetermined threshold.

15. A system for executing a game, the system comprising:
   a processor; and
   a memory, wherein the memory includes program instructions for a social manager module, a visit manager module, and a game module that provides a graphical user interface (GUI) for a first player in the game, the GUI including a first game board of the first player, wherein the social manager module, when executed by the processor, manages friendship relationships established between players in the game player, wherein the game identifies a plurality of slots in a timeline and identifies a sliding window that includes a predetermined number of most recent time slots;
   wherein the visit manager module, when executed by the processor, detects visits by the first player to a second game board of a second player in the game, wherein the first game board is different from the second game board; wherein the visit manager module determines a number of time slots in the sliding window where the first player visited the second game board; and wherein the visit manager module assigns the first player a regular visitor status when the number of time slots in the sliding window is equal to or greater than a predetermined threshold, and giving the first player a non-regular visitor status when the number of time slots is less than the predetermined threshold;
   wherein the game module, when executed by the processor, displays on the GUI a bar that includes a fragment for each time slot in the sliding window, each fragment indicating if the first player visited the second player in the respective time slot, and the game module gives the first player a special reward when the first player has the regular visitor status, wherein the special reward is not given to the first player when the first player has the non-regular visitor status.

16. The system of claim 15, wherein the social manager module obtains information regarding links between players of the game in a social network outside the game by utilizing an application programming interface (API) to access the social network.

* * * * *